United States Patent
Hamaguchi et al.

(10) Patent No.: US 8,578,616 B2
(45) Date of Patent: Nov. 12, 2013

(54) RELATIVE ANGLE SENSING DEVICE AND ELECTRIC POWER STEERING APPARATUS

(75) Inventors: Yusuke Hamaguchi, Tochigi (JP); Yohei Hama, Tochigi (JP); Koichi Hata, Tochigi (JP)

(73) Assignee: Showa Corporation, Saitama (JP)

( * ) Notice: Subject to any disclaimer, the term of this patent is extended or adjusted under 35 U.S.C. 154(b) by 60 days.

(21) Appl. No.: 13/471,038

(22) Filed: May 14, 2012

(65) Prior Publication Data

US 2012/0297634 A1 Nov. 29, 2012

(30) Foreign Application Priority Data

May 23, 2011 (JP) ................................. 2011-114913
Dec. 20, 2011 (JP) ................................. 2011-277790

(51) Int. Cl.
*G01B 7/30* (2006.01)

(52) U.S. Cl.
USPC ............................................ 33/1 PT; 33/1 N

(58) Field of Classification Search
USPC .......................................... 33/1 PT, 1 N, 534
See application file for complete search history.

(56) References Cited

U.S. PATENT DOCUMENTS

| | | | | |
|---|---|---|---|---|
| 4,369,578 A | * | 1/1983 | Ernst | 33/1 PT |
| 6,155,106 A | * | 12/2000 | Sano | 33/1 N |
| 2001/0034943 A1 | * | 11/2001 | Itomi | 33/1 N |
| 2004/0244210 A1 | * | 12/2004 | Harrer | 33/1 PT |
| 2009/0199417 A1 | * | 8/2009 | Riepertinger | 33/1 PT |
| 2012/0297634 A1 | * | 11/2012 | Hamaguchi et al. | 33/1 PT |
| 2013/0063136 A1 | * | 3/2013 | Hamaguchi et al. | 324/207.25 |
| 2013/0134966 A1 | * | 5/2013 | Hamaguchi et al. | 324/207.25 |
| 2013/0168125 A1 | * | 7/2013 | Hama | 174/73.1 |

FOREIGN PATENT DOCUMENTS

JP       2007-187589       7/2007

* cited by examiner

*Primary Examiner* — Yaritza Guadalupe-McCall
(74) *Attorney, Agent, or Firm* — Leason Ellis LLP

(57) ABSTRACT

A relative angle sensing device includes: a sensor contained in a housing provided with a communication hole and outputting an electric signal corresponding to a relative rotation angle between two rotary shafts coaxially arranged; an electric cable transmitting the electric signal to a device arranged outside of the housing; an electric cable holding member fitted with the communication hole and holding the electric cable; and an external member arranged at a location outer than the electric cable holding member, wherein the external member includes a pair of dividable members dividable in a direction intersecting a hole direction of the communication hole, and the external member passes the electric cable within the pair of dividable members and presses the electric cable with the pair of dividable members to change a direction of the electric cable at the outside of the housing into the direction intersecting the hole direction.

9 Claims, 25 Drawing Sheets

AMOUNT OF CHANGE IN RESISTANCE

ANGLE (θ)

RESISTANCE

ANGLE (θ)

FIG.8A
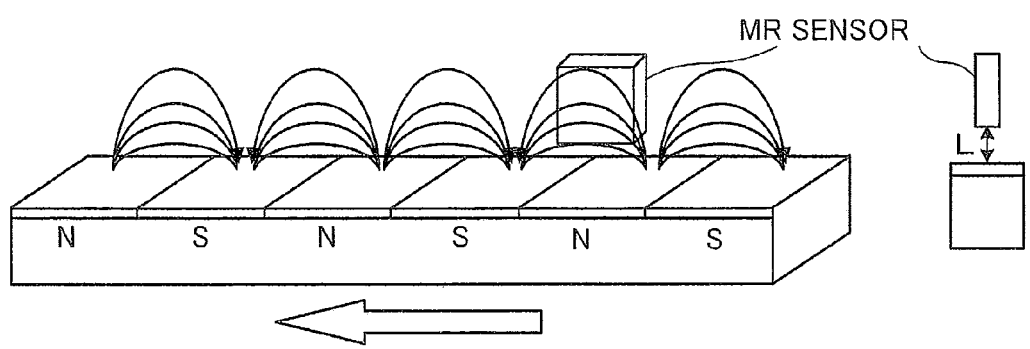
FIG.8B
MR SENSOR
FIG.8C
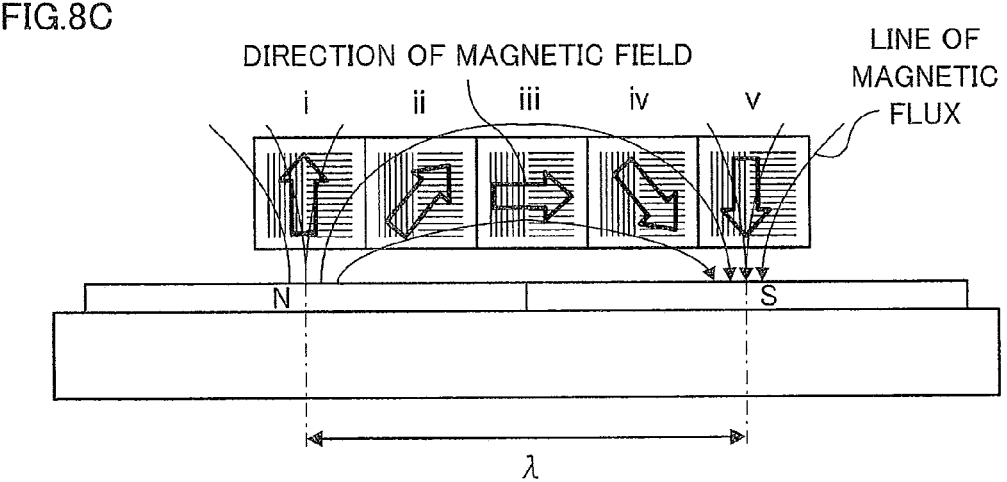
DIRECTION OF MAGNETIC FIELD
LINE OF MAGNETIC FLUX
FIG.8D
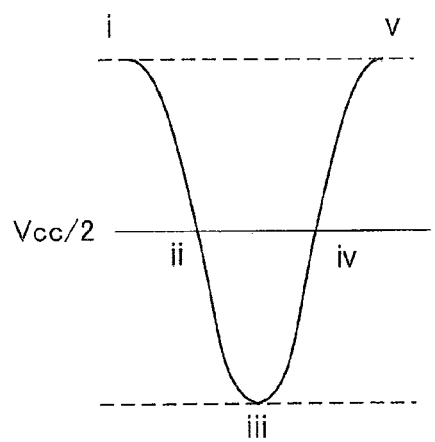

45 DEGREES

CONFIGURATION OF ELEMENT

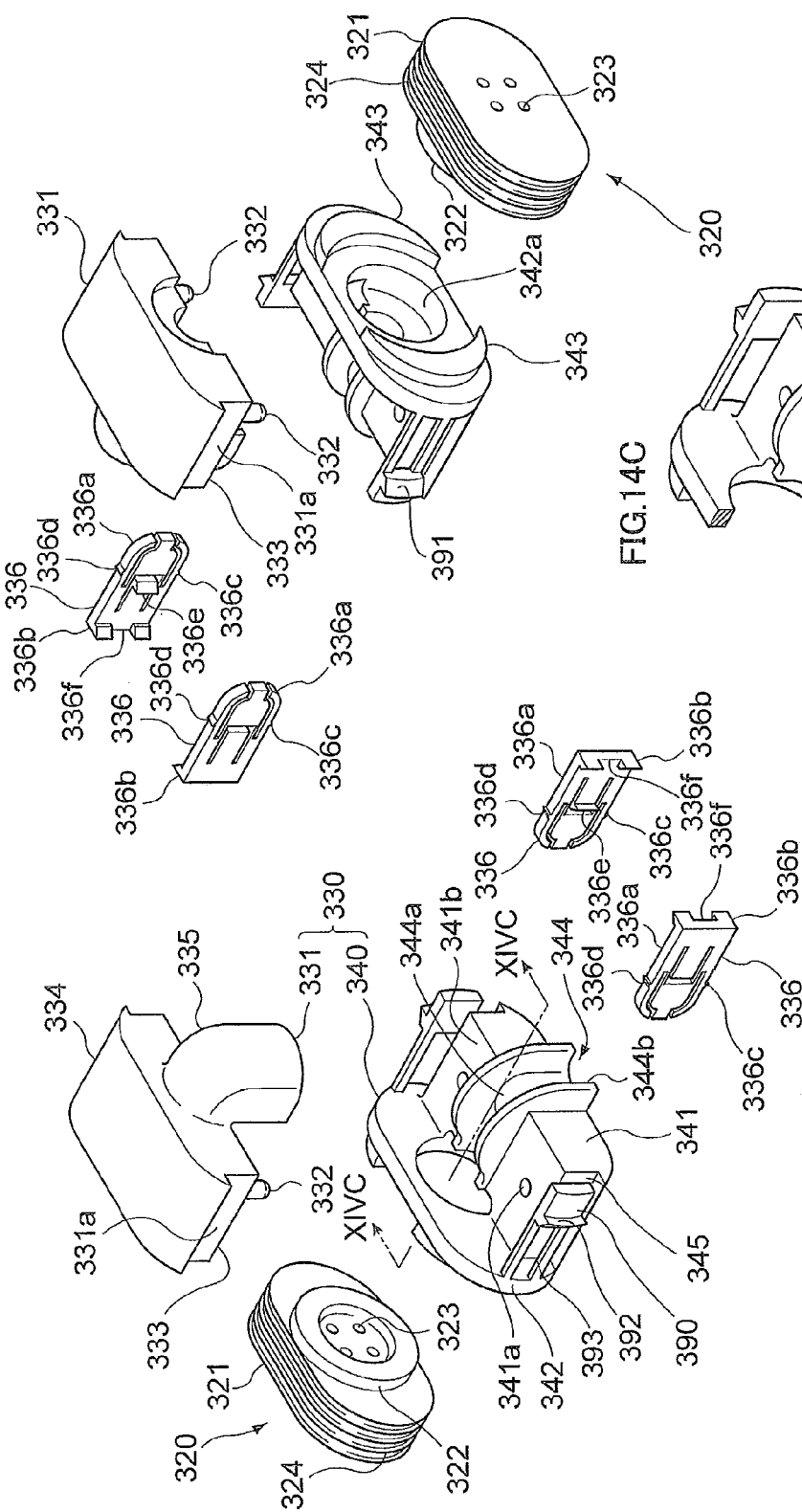

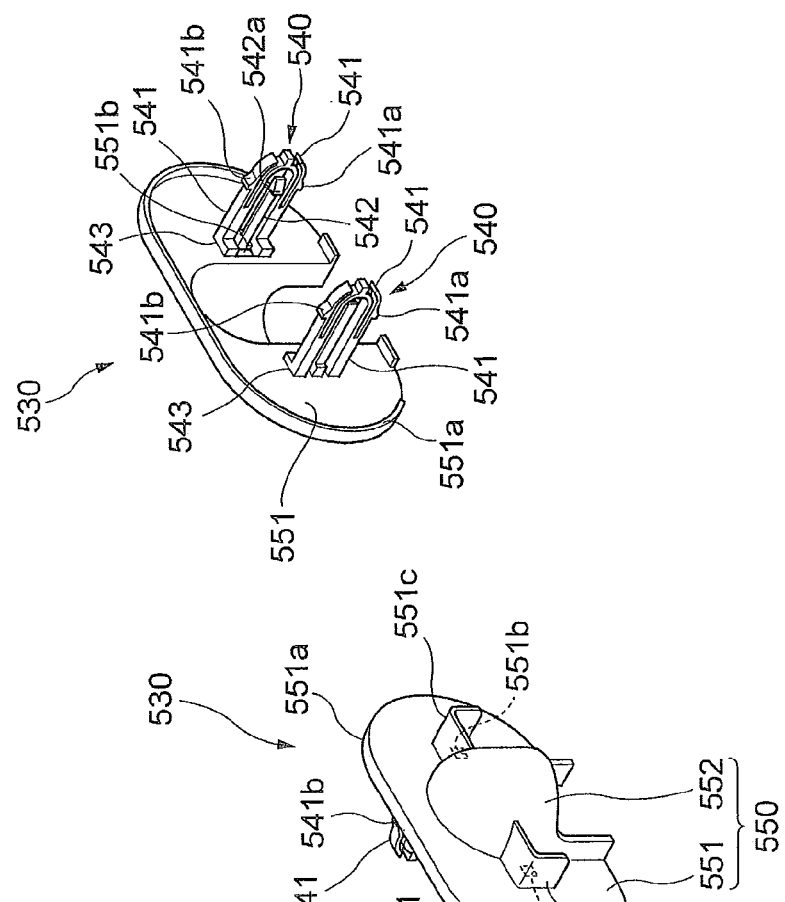
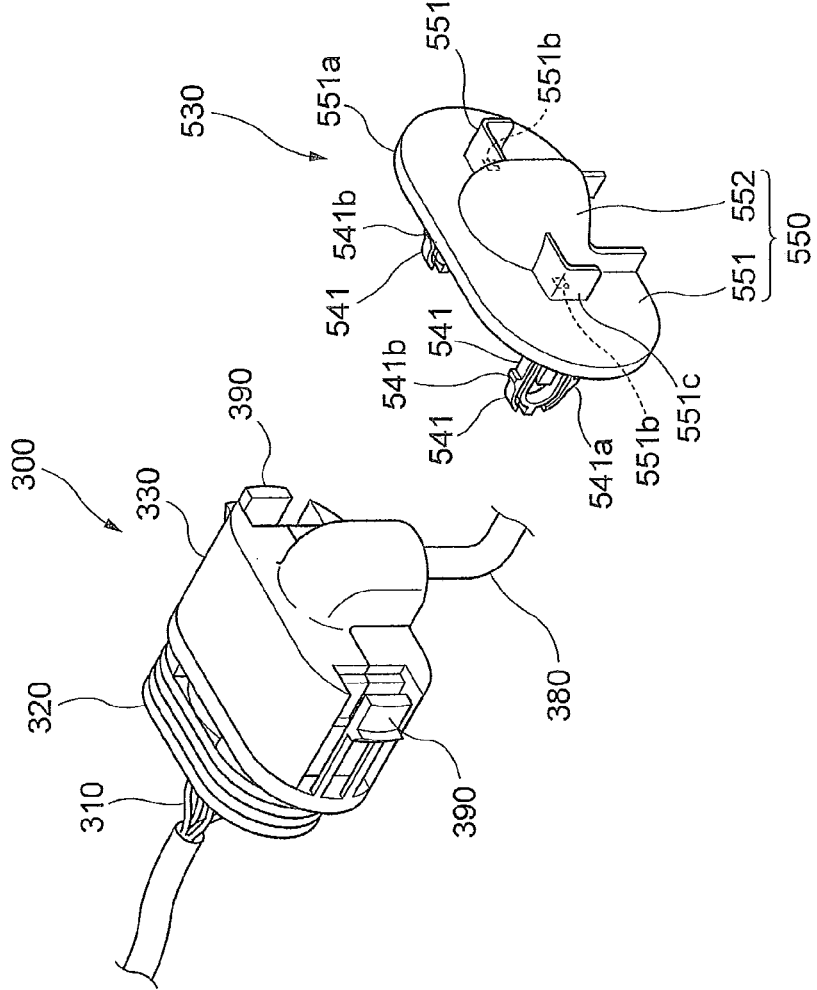

RELATIVE ANGLE SENSING DEVICE AND ELECTRIC POWER STEERING APPARATUS

CROSS REFERENCE TO RELATED APPLICATIONS

This application is based on and claims priority under 35 USC §119 from Japanese Patent Applications Nos. 2011-114913 filed May 23, 2011 and 2011-277790 filed Dec. 20, 2011.

BACKGROUND

1. Technical Field

The present invention relates to a relative angle sensing device and an electric power steering apparatus.

2. Related Art

Recently, there has been suggested a device for sensing a relative rotation angle between two rotary shafts coaxially arranged.

For example, a device described in Japanese Patent Application Laid Open Publication No. 2007-187589 includes: two magnetic-flux collecting rings provided outside of and away in an axial direction from magnetic circuit forming components held by a first rotating body and a second rotating body coaxially coupled to each other by a torsion bar, the two magnetic-flux collecting rings collecting a magnetic flux generated by the magnetic circuit forming components; a detection unit that detects torque added to the first rotating body based on a density of magnetic flux collected by each of the magnetic-flux collecting rings; a holding ring that holds the magnetic-flux collecting rings and the detection unit, and has an attachment portion on a circumferential portion thereof attached to a housing; and a conductor wire connected to the detection unit. The detection unit is configured so that a detection signal is changed in accordance with change of the density of magnetic flux generated between protruding pieces of the magnetic-flux collecting rings, and the detection signal is provided to a controller constituted by a microprocessor through the conductor wire.

In a case where a configuration is such that a sensor (the detection unit) contained in the housing and a device provided with the detection signal from the sensor and arranged outside of the housing are connected with electric cables (conductor cables) held by an electric cable holding member (a grommet) inserted into a through hole of the housing, even if a force is applied to the electric cables at the outside of the housing, there is a possibility that a large force is applied to end portions of the electric cables at the inside of the housing. For example, in a case where the end portions of the electric cables are coupled to a connector inserted into a connecting terminal, there is a possibility that the electric cables detach from the connector or the connecting terminal into which the connector is inserted is broken when the large force is applied to the end portions of the electric cables at the inside of the housing. Additionally, due to the force applied to the electric cables at the outside of the housing, there is a possibility that sealing properties of the electric cables in the electric cable holding member (the grommet) are deteriorated.

On this problem, it is considered to prevent detachment of the electric cable holding member (the grommet) inserted into the through hole formed in the housing and to support the electric cables by arranging a plate made of a sheet metal at the outside of the housing, for example. However, in this configuration, if the housing is made of aluminum, there is a possibility that the electric cable holding member (the grommet) detaches due to electrochemical corrosion caused between the plate and the housing. In addition, the number of assembling process is increased for arranging the plate outside of the housing.

An object of the present invention is to suggest a device that realizes, with a simple configuration, an intention not to exert a large force on the electric cable holding part in the electric cable holding member and the end portions of the electric cables inside of the housing even though a force is exerted on the electric cables at the outside of the housing.

SUMMARY

According to an aspect of the present invention, there is provided a relative angle sensing device including: a sensor that is contained in a housing provided with a communication hole for communicating an inside and an outside thereof, and outputs an electric signal corresponding to a relative rotation angle between two rotary shafts arranged coaxially with each other; an electric cable that transmits the electric signal outputted from the sensor to a device arranged outside of the housing; an electric cable holding member that is fitted with the communication hole of the housing and holds the electric cable; and an external member that is arranged at a location outer than the electric cable holding member in the communication hole of the housing, wherein the external member includes a pair of dividable members that is dividable in a direction intersecting a hole direction of the communication hole provided in the housing, and the external member passes the electric cable within the pair of dividable members and presses the electric cable with the pair of dividable members, and thereby changes a direction of the electric cable at the outside of the housing into the direction intersecting the hole direction.

Here, a shape of a part of a passage of the electric cable within the pair of dividable members in the hole direction of the communication hole may be a chevron shape to protrude in a direction opposite to the direction of the electric cable at the outside of the housing.

Further, the pair of dividable members may include a convex part that is fitted with a concave part formed in the housing and dented from a surface of the communication hole.

Still further, the convex part of the pair of dividable members may be provided to be elastically deformable in a direction intersecting a dividing direction at each of both ends of the pair of dividable members in the direction intersecting the dividing direction, and the relative angle sensing device may further include a deformation suppressing component that is arranged inside the convex part to suppress elastic deformation of the convex part when the convex part is fitted with the concave part of the housing.

Still further, the deformation suppressing component may include a deformation suppressing part that is arranged inside the convex part of the pair of dividable members to suppress elastic deformation of the convex part when the convex part is fitted with the concave part of the housing and a covering part that covers a gap between a surrounding wall forming the communication hole in the housing and the external member, and the deformation suppressing part and the covering part may be integrally formed.

According to another aspect of the present invention, there is provided an electric power steering apparatus including: a sensor that outputs an electric signal corresponding to a relative rotation angle between two rotary shafts arranged coaxially with each other; a housing that contains the sensor and is provided with a communication hole for communicating an inside and an outside thereof; an electric cable that transmits the electric signal outputted from the sensor to a device arranged outside of the housing; an electric cable holding member that is fitted with the communication hole of the housing and holds the electric cable; and an external member that is arranged at a location outer than the electric cable holding member in the communication hole of the housing, wherein the external member includes a pair of dividable members that is dividable in a direction intersecting a hole direction of the communication hole provided in the housing, and the external member passes the electric cable within the pair of dividable members and presses the electric cable with the pair of dividable members, and thereby changes a direction of the electric cable at the outside of the housing into the direction intersecting the hole direction.

According to the present invention, it is possible to realize, with a simple configuration, an intention not to exert a large force on the electric cable holding part in the electric cable holding member and the end portions of the electric cables inside of the housing even though a force is exerted on the electric cables at the outside of the housing.

BRIEF DESCRIPTION OF THE DRAWINGS

Exemplary embodiments of the present invention will be described in detail based on the following figures, wherein:

FIGS. 8A to 8D are diagrams for illustrating a relationship between the change of the direction of the magnetic field and the output of the MR sensor when the magnet moves in a straight line;

FIGS. 14A to 14C are schematic configuration diagrams of the grommet and a socket;

FIGS. 20A and 20B are schematic configuration diagrams of the detachment preventing components according to still another exemplary embodiment;

DETAILED DESCRIPTION

Hereinafter, an exemplary embodiment of the present invention will be described in detail with reference to the attached drawings.

Figure 1A:
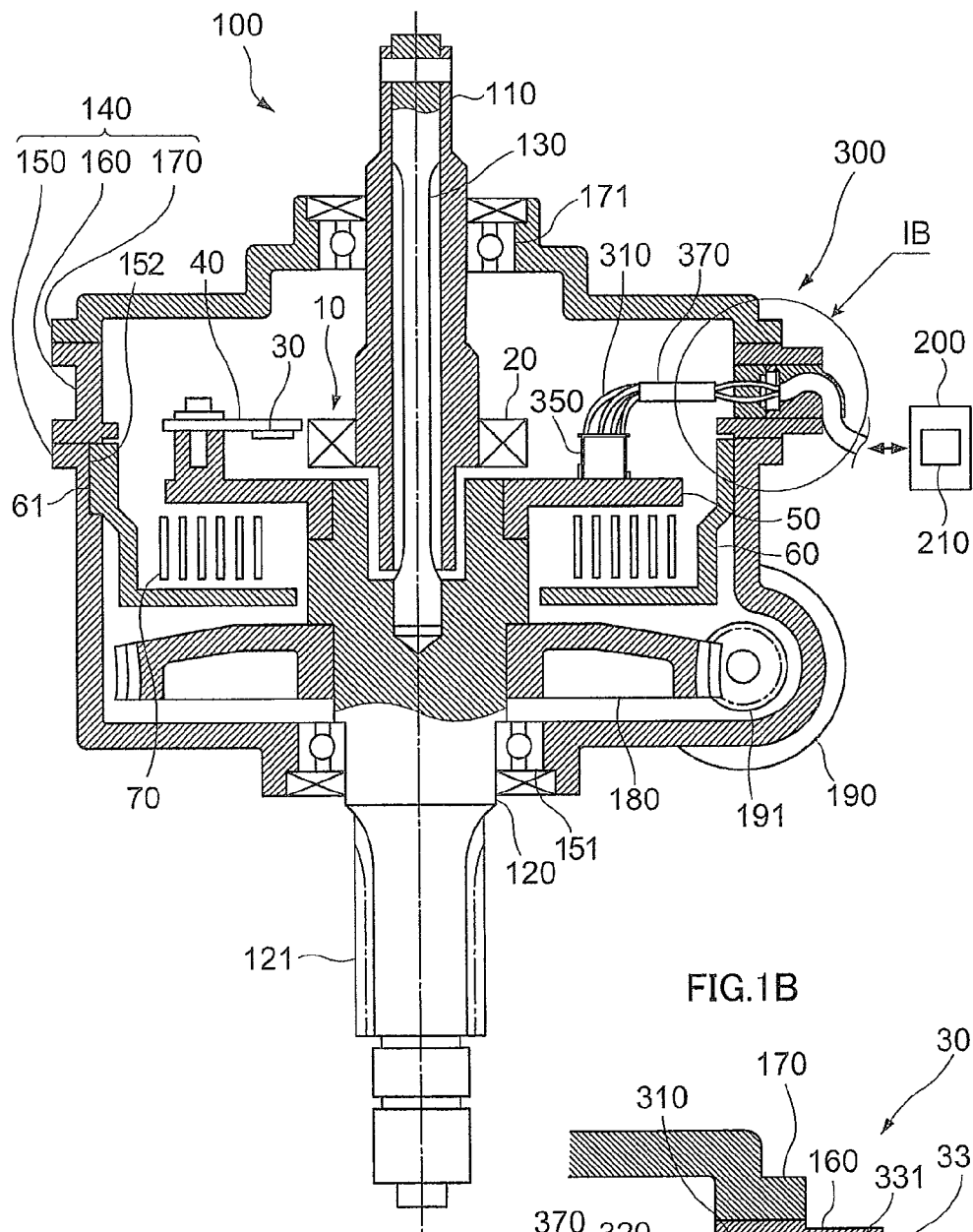
FIGS. 1A and 1B are cross-sectional views of an electric power steering apparatus to which a sensing device according to an exemplary embodiment is applied.
Figure 1B:
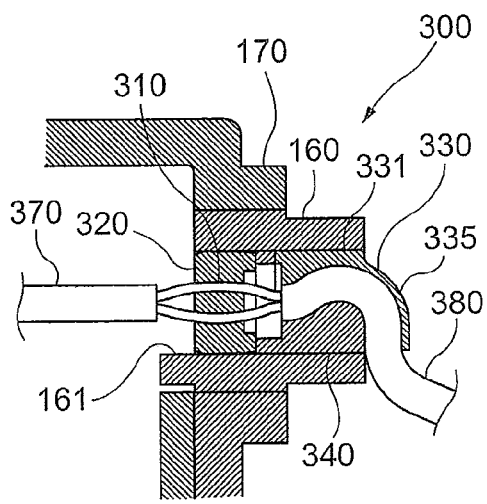
Figure 2:
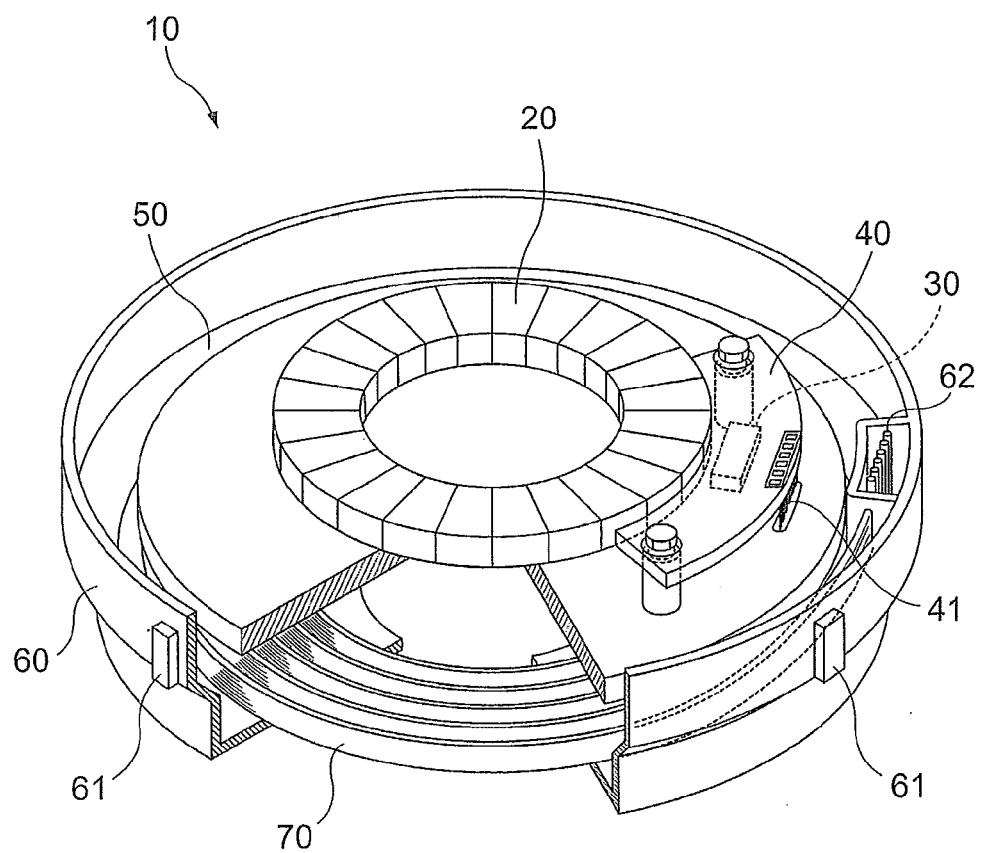
FIG. 2 is a perspective view of the sensing device according to the exemplary embodiment.

FIGS. 1A and 1B are cross-sectional views of an electric power steering apparatus 100 to which a sensing device 10 according to the exemplary embodiment is applied. FIG. 2 is a perspective view of the sensing device 10 according to the exemplary embodiment. It should be noted that, in order to easily understand the configuration, a part of a base 50 and a flat cable cover 60 that will be described later is omitted in FIG. 2.

The electric power steering apparatus 100 is provided with a first rotary shaft 110 and a second rotary shaft 120 that coaxially rotate. The first rotary shaft 110 is a rotary shaft to which, for example, a steering wheel is connected, and the second rotary shaft 120 is coaxially connected to the first rotary shaft 110 through a torsion bar 130. A pinion 121 formed on the second rotary shaft 120 is engaged with a rack (not shown) of a rack shaft (not shown) which is connected to wheels, and rotary movement of the second rotary shaft 120 is converted into linear movement of the rack shaft through the pinion 121 and the rack, and thereby the wheels are steered.

The electric power steering apparatus 100 is provided with a housing 140 that rotatably supports the first rotary shaft 110 and the second rotary shaft 120. The housing 140 is a component fixed to a body frame (hereinafter, referred to as "vehicle" in some cases) of a vehicle such as an automobile, and is formed of a first housing 150, a second housing 160 and a third housing 170.

The first housing 150 is a component having a shaft bearing 151 that rotatably supports the second rotary shaft 120, on one end side of the second rotary shaft 120 (lower side in FIG. 1A) in a rotary shaft direction (hereinafter, simply referred to as "shaft direction" in some cases), and an opening on the other end side (upper side in FIG. 1A) in the shaft direction.

The second housing 160 is a component having openings at both ends in the shaft direction, and is arranged so that one opening on one end side in the shaft direction faces the opening of the first housing 150 on the other end side in the shaft direction. The second housing 160 is fixed to the first housing 150 with, for example a bolt or the like. On the side surface of the second housing 160, a communication hole 161 for communicating the inside and the outside thereof is formed. The communication hole 161 includes an inner communication hole 161a with which a later-described grommet 320 of a harness component 300 is fitted and that is approximately formed into an elliptic cylinder, and an outer communication hole 161b with which a socket 330 of the harness component 300 is fitted and that is approximately formed into an elliptic cylinder. The outer communication hole 161b has the short side of the ellipse having the same length as that of the inner communication hole 161a, and a longer long side thereof than the inner communication hole 161a. The second housing 160 has concave parts 162 (refer to FIGS. 15A and 15B) that are located in the middle of the communication hole 161 in the cylindrical direction of the elliptic cylinder (communication-hole direction), that are concave from a surface forming the outer communication hole 161b of the communication hole 161, and that are formed on both sides in the long side direction of the ellipse. Each of the concave parts 162 is a semicircular column, and has two vertical surfaces 162a vertical to the cylindrical direction.

The third housing 170 is a component having a shaft bearing 171 that rotatably supports the first rotary shaft 110 on the other end side in the shaft direction (upper side in FIG. 1A), and an opening on one end side in the shaft direction (lower side in FIG. 1A). The third housing 170 is arranged so that the opening on one end side in the shaft direction faces the opening of the second housing 160 on the other end side in the shaft direction, and is fixed to the second housing 160 with, for example, a bolt or the like.

The electric power steering apparatus 100 is provided with: a worm wheel 180 that is fixed to the second rotary shaft 120 by, for example, press fitting; and an electric motor 190 that has a worm gear 191 engaged with the worm wheel 180 and connected to the output shaft, and that is fixed to the first housing 150.

The electric power steering apparatus 100 is provided with: the sensing device 10 that outputs an electric signal corresponding to the relative rotation angle between the first rotary shaft 110 and the second rotary shaft 120; and an electronic control unit (ECU) 200 that controls driving of the electric motor 190 on the basis of the output value of the sensing device 10.

The ECU 200 includes a relative angle calculator 210 that calculates the relative rotation angle between the first rotary shaft 110 and the second rotary shaft 120 on the basis of the output value from the sensing device 10 by using a CPU that executes various kinds of arithmetic processing, a ROM in which programs executed by the CPU, various kinds of data and the like are stored, and a RAM used as a working memory for the CPU and the like.

Detailed description of the sensing device 10 will be given later.

In the electric power steering apparatus 100 having the aforementioned configuration, since steering torque applied to the steering wheel appears as the relative rotation angle between the first rotary shaft 110 and the second rotary shaft 120, the steering torque is recognized on the basis of the relative rotation angle between the first rotary shaft 110 and the second rotary shaft 120. That is, the relative rotation angle between the first rotary shaft 110 and the second rotary shaft 120 is sensed by the sensing device 10, the ECU 200 recognizes the steering torque on the basis of the output value from the sensing device 10, and driving of the electric motor 190 is controlled on the basis of the recognized steering torque. Then, the generated torque of the electric motor 190 is transmitted to the second rotary shaft 120 through the worm gear 191 and the worm wheel 180. Thereby, the generated torque of the electric motor 190 assists steering force of a driver applied to the steering wheel.

Hereinafter, detailed description will be given for the sensing device 10.

The sensing device 10 is provided with: a magnet 20 that is attached to the first rotary shaft 110; a relative angle sensor 30 that outputs an electric signal corresponding to the relative rotation angle between the first rotary shaft 110 and the second rotary shaft 120 on the basis of the magnetic field generated by the magnet 20; and a printed substrate 40 on which the relative angle sensor 30 is mounted. Further, the sensing device 10 is provided with: the base 50 that is attached to the second rotary shaft 120 and that supports the printed substrate 40; and the flat cable cover 60 in which a later-described flat cable 70 is contained, and that is formed into a cylinder with a bottom. Furthermore, the sensing device 10 is provided with: the flat cable 70 that has one end connected to a terminal arranged on the printed substrate 40, and the other end connected to a terminal fixed to the flat cable cover 60; and the harness component 300 that connects the ECU 200 and the terminal fixed to the flat cable cover 60.

The magnet 20 has a cylindrical (toroidal) shape and the first rotary shaft 110 is fitted into the inside thereof, and the magnet 20 and the first rotary shaft 110 rotate together with each other. North poles and south poles of the magnet 20 are alternately arranged in the circumferential direction of the first rotary shaft 110, and the magnet 20 is magnetized in the circumferential direction.

The relative angle sensor 30 is arranged outside the outer peripheral surface of the magnet 20 in a rotational radial direction of the first rotary shaft 110, and within a region in which the magnet 20 is provided in the shaft direction of the first rotary shaft 110. The relative angle sensor 30 according to the exemplary embodiment is a MR sensor (magnetoresistive element) that is a magnetic sensor using change in resistance by a magnetic field. The relative angle sensor 30 outputs the electric signal corresponding to the relative rotation angle between the first rotary shaft 110 and the second rotary shaft 120 on the basis of the magnetic field generated by the magnet 20, and thereby the relative rotation angle between the two rotary shafts that are coaxially arranged is sensed. Detailed description will be given later for the relative angle sensor 30 and the sensing method of the relative rotation angle.

The printed substrate 40 is fixed to the base 50 with, for example, a bolt or the like so as to be arranged outside the outer peripheral surface of the magnet 20 in the rotational radial direction of the first rotary shaft 110.

The base 50 is a disc-shaped component, is fitted with the second rotary shaft 120, and rotates together with the second rotary shaft 120.

The flat cable cover 60 is a cylindrical component with a bottom, and is fixed to the housing 140. The following configuration is exemplified as a configuration in which the flat cable cover 60 is fixed to the housing 140. That is, plural convex parts 61 that are arranged on the outer peripheral surface of the flat cable cover 60 at regular intervals in the circumferential direction (4 convex parts arranged at intervals of 90 degrees in the exemplary embodiment) are formed so as to extend outside. On the other hand, on the first housing 150 of the housing 140, concave parts 152 the number of which is the same as the number of the convex parts 61 are formed, with which the convex parts 61 are fitted. By fitting the convex parts 61 of the flat cable cover 60 with the concave parts 152 formed on the first housing 150, the second rotary shaft 120 is positioned in the rotational direction. Further, by pressing the upper surface of the flat cable cover 60 with the second housing 160, positioning is conducted in the shaft direction. Alternatively, the flat cable cover 60 may be fixed to the first housing 150 or the second housing 160 with, for example, a bolt or the like.

One end of the flat cable 70 is connected to a terminal 41 of the printed substrate 40, the other end of the flat cable 70 is connected to a connecting terminal 62 arranged inside the flat cable cover 60, and the flat cable 70 is contained in a space formed by the inside of the flat cable cover 60 and one end surface of the base 50 in a spirally wound state. The flat cable 70 is wound in a right-handed direction as shown in FIG. 2 when it is seen from the other end side in the shaft direction, and in a case where the steering wheel, that is, the first rotary shaft 110 and the second rotary shaft 120 are rotated in the right-handed direction, one end rotates in the right-handed direction according to the rotation of the second rotary shaft 120, and thus the number of windings increases in comparison with a neutral state in which the steering wheel is not rotated. On the other hand, in a case where the steering wheel is rotated in a left-handed direction, the number of windings decreases in comparison with the neutral state in which the steering wheel is not rotated.

The harness component 300 has a function for transmitting the output signal from the relative angle sensor 30 to the ECU 200. Detailed description will be given later for the harness component 300.

Hereinafter, description will be given for the relative angle sensor 30 according to the exemplary embodiment.

The relative angle sensor 30 according to the exemplary embodiment is a MR sensor (magnetoresistive element) using change in resistance according to a magnetic field.

First, an operating principle of the MR sensor will be described.

The MR sensor is formed of a Si or a glass substrate, and a thin film that is formed thereon and is made of an alloy mainly containing a ferromagnetic metal such as Ni—Fe, and the resistance of the thin-film ferromagnetic metal changes in accordance with intensity of a magnetic field in a specific direction.

Figure 3:
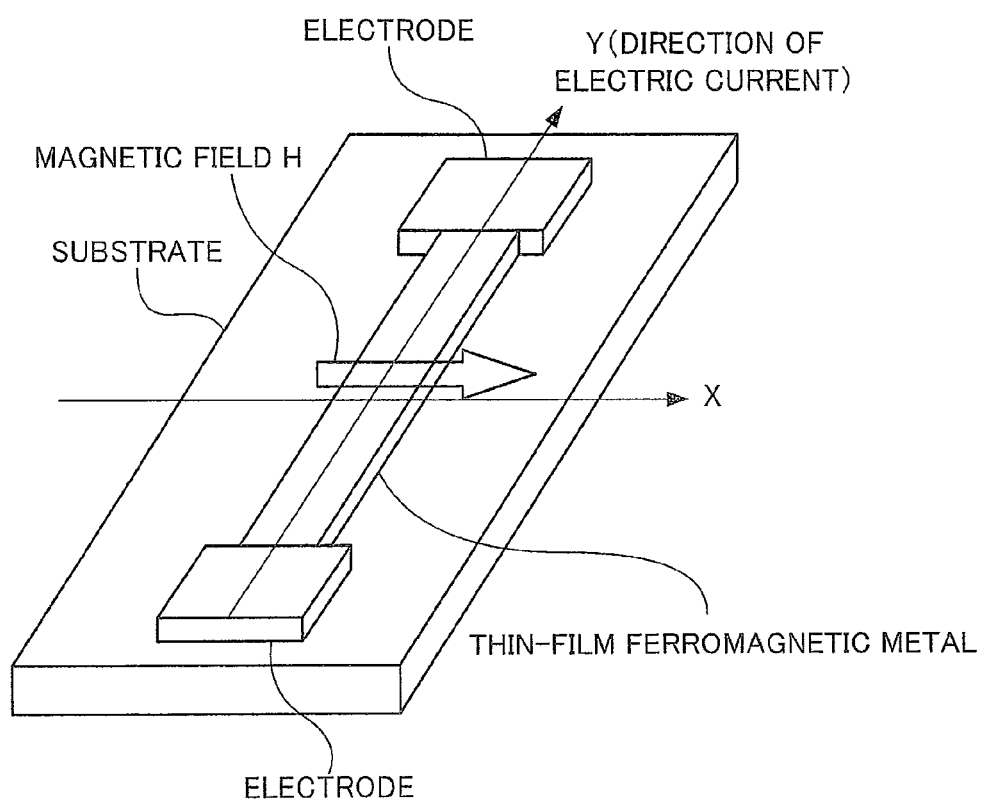
FIG. 3 is a diagram for illustrating a direction of an electric current applied to the thin-film ferromagnetic metal and a direction of an applied magnetic field.
Figure 4:
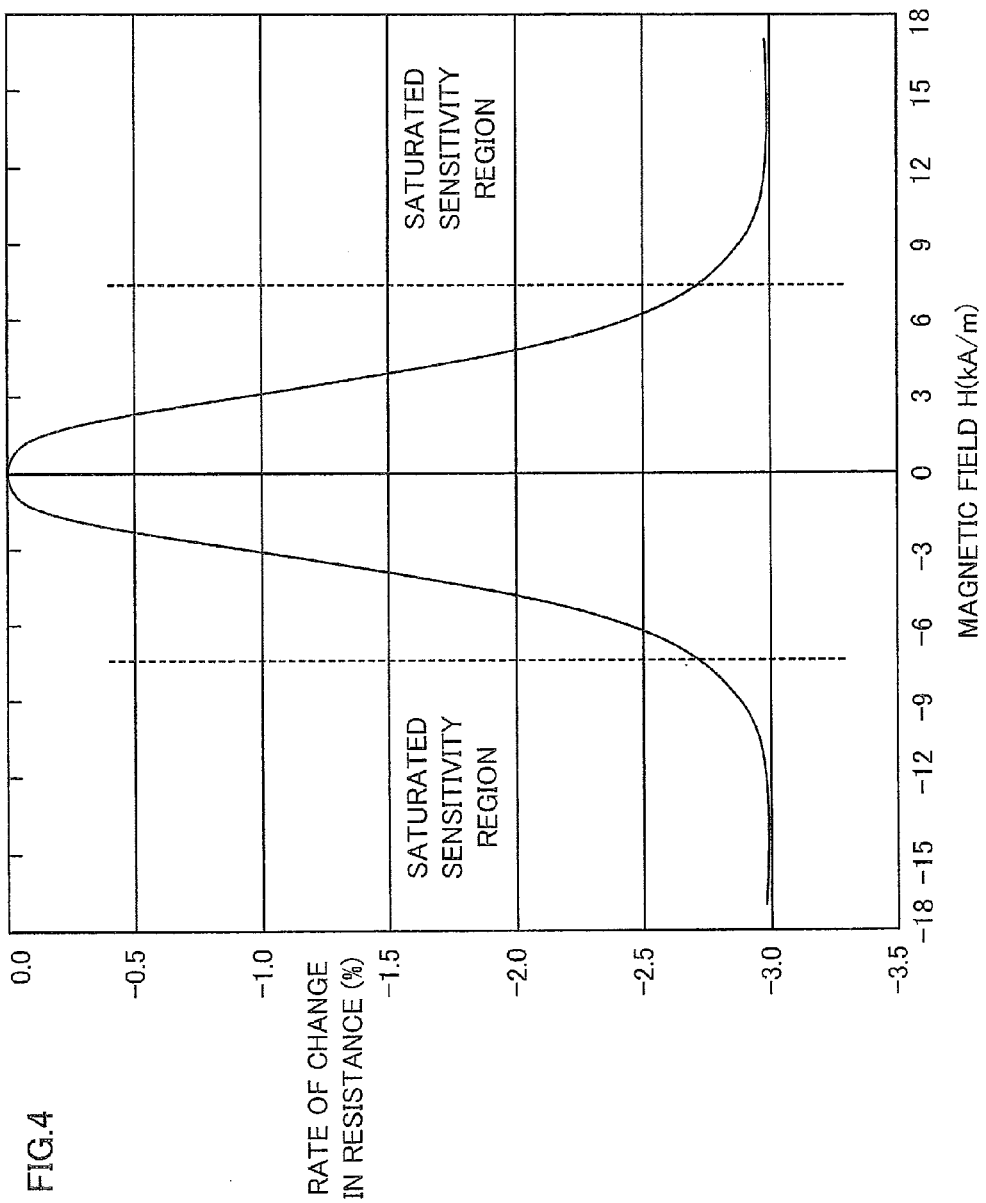
FIG. 4 is a graph for showing a relationship between intensity of the magnetic field and resistance of the thin-film ferromagnetic metal in the case where the intensity of the magnetic field is changed in the state shown in FIG. 3.

FIG. 3 is a diagram for illustrating a direction of an electric current applied to the thin-film ferromagnetic metal and a direction of an applied magnetic field. FIG. 4 is a graph for showing a relationship between intensity of the magnetic field and resistance of the thin-film ferromagnetic metal in a case where the intensity of the magnetic field is changed in the state shown in FIG. 3.

As shown in FIG. 3, an electric current is applied to the thin-film ferromagnetic metal forming into a rectangle on the substrate in a long side direction of the rectangle, that is, a Y direction in the figure. On the other hand, a magnetic field H is applied thereto in a vertical direction (X direction in the figure) with respect to the direction of the electric current (Y direction), and the intensity of the magnetic field is changed in this condition. It is FIG. 4 that shows how the resistance of the thin-film ferromagnetic metal is changed in such a condition.

As shown in FIG. 4, even if the intensity of the magnetic field is made to be changed, a rate of change in the resistance from a point at no magnetic field (point where the intensity of the magnetic field is zero) is up to approximately 3%.

Hereinafter, a region outside a region in which the amount of change in the resistance ($\Delta R$) is approximately represented by a formula, "$\Delta R \propto H^2$" is referred to as "saturated sensitivity region." In the saturated sensitivity region, the rate of change in the resistance of 3% does not vary if the intensity of the magnetic field is not less than certain intensity (hereinafter, referred to as "specified intensity of the magnetic field").

Figure 5:
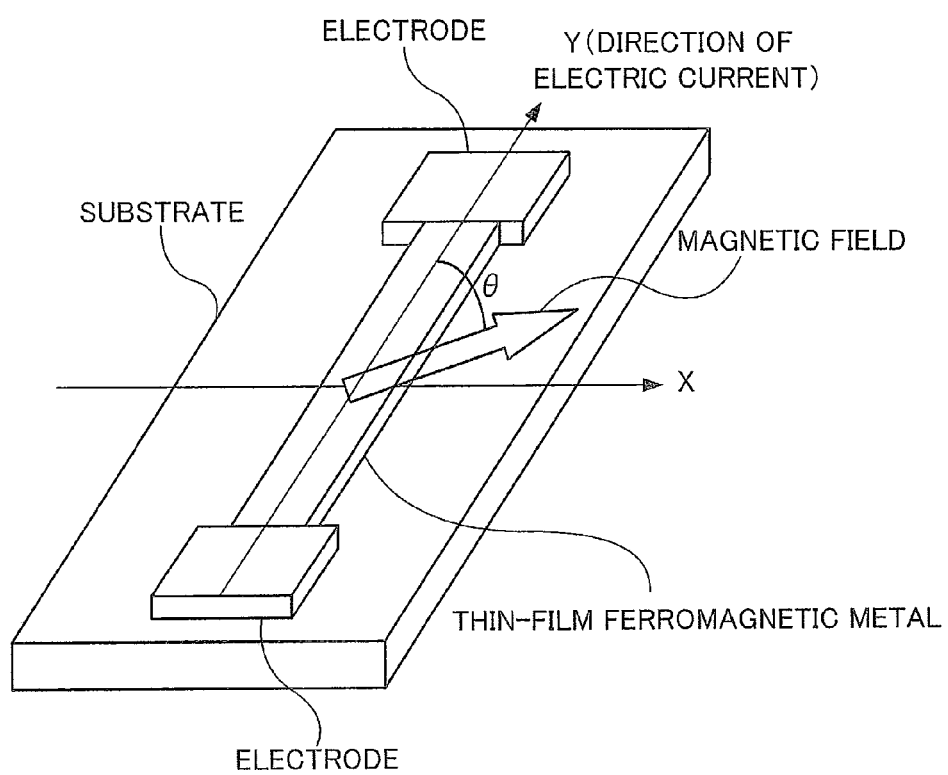
FIG. 5 is a diagram for illustrating a direction of an electric current applied to the thin-film ferromagnetic metal and a direction of an applied magnetic field.
Figure 6A:
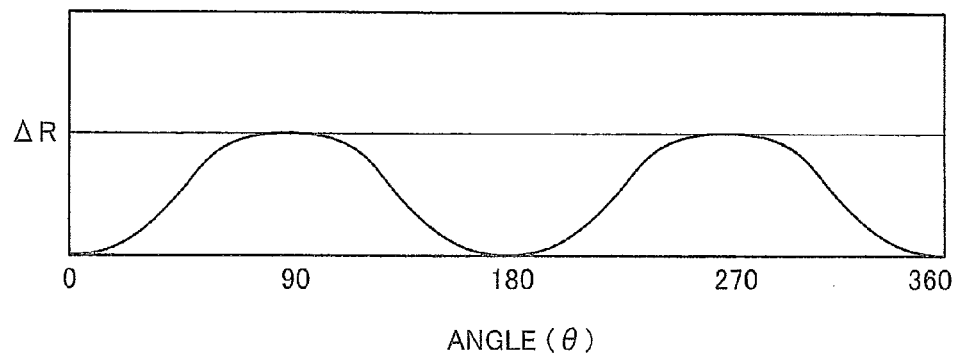
FIGS. 6A and 6B are graphs for showing a relationship between the direction of the magnetic field and the resistance of the thin-film ferromagnetic metal.
Figure 6B:
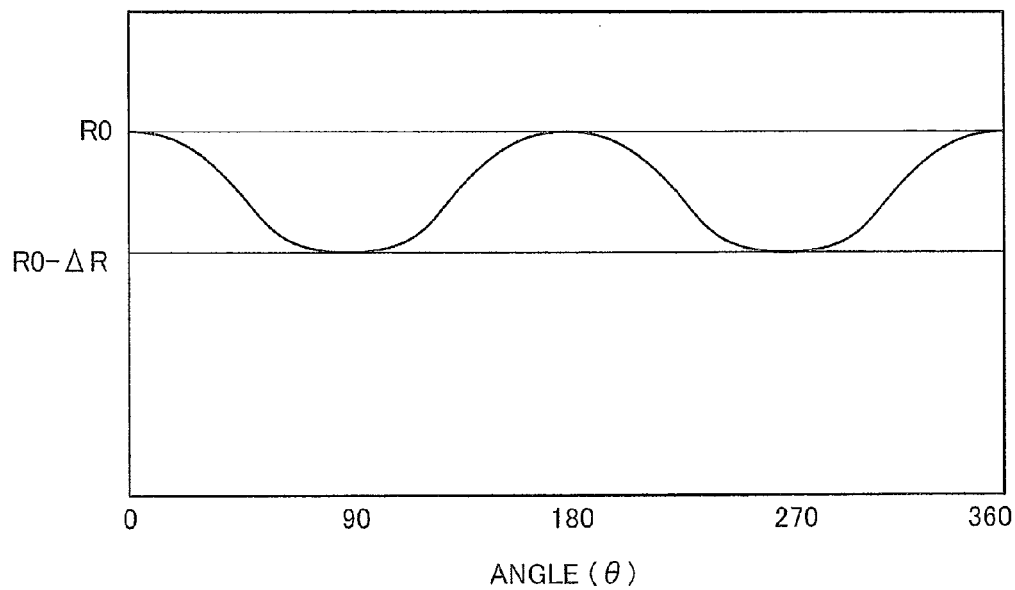

FIG. 5 is a diagram for illustrating a direction of an electric current applied to the thin-film ferromagnetic metal and a direction of an applied magnetic field. FIGS. 6A and 6B are graphs for showing a relationship between the direction of the magnetic field and the resistance of the thin-film ferromagnetic metal.

As shown in FIG. 5, an electric current is made to flow in a direction of the long side of the rectangle forming the thin-film ferromagnetic metal, that is, a Y direction in FIG. 5, and, as a direction of the magnetic field, change of an angle $\theta$ is given with respect to the direction of the electric current. At this time, in order to recognize change in the resistance of the thin-film ferromagnetic metal due to the direction of the magnetic field, the intensity of the magnetic field applied thereto is not less than the aforementioned specified intensity of the magnetic field at which the resistance does not change due to the intensity of the magnetic field.

As shown in FIG. 6A, the amount of change in the resistance is maximum when the direction of the electric current and the direction of the magnetic field are vertical to each other ($\theta$=90 degrees, or 270 degrees), and is minimum when the direction of the electric current and the direction of the magnetic field are parallel to each other ($\theta$=0 degree, or 180 degrees). If the maximum amount of change in the resistance in this case is set as $\Delta R$, the resistance of the thin-film ferromagnetic metal R changes as an angular component between the direction of the electric current and the direction of the magnetic field, is represented by an equation (1), and is shown in FIG. 6B.

$$R = R0 - \Delta R \sin^2 \theta \tag{1}$$

Herein, R0 denotes the resistance in a case where the magnetic field not less than the specified intensity of the magnetic field is applied thereto so as to be parallel to the direction of the electric current (0=0 degree or 180 degrees).

By the equation (1), the direction of the magnetic field not less than the specified intensity of the magnetic field can be sensed by recognizing the resistance of the thin-film ferromagnetic metal.

Next, a sensing principle of the MR sensor will be described.

Figure 7A:
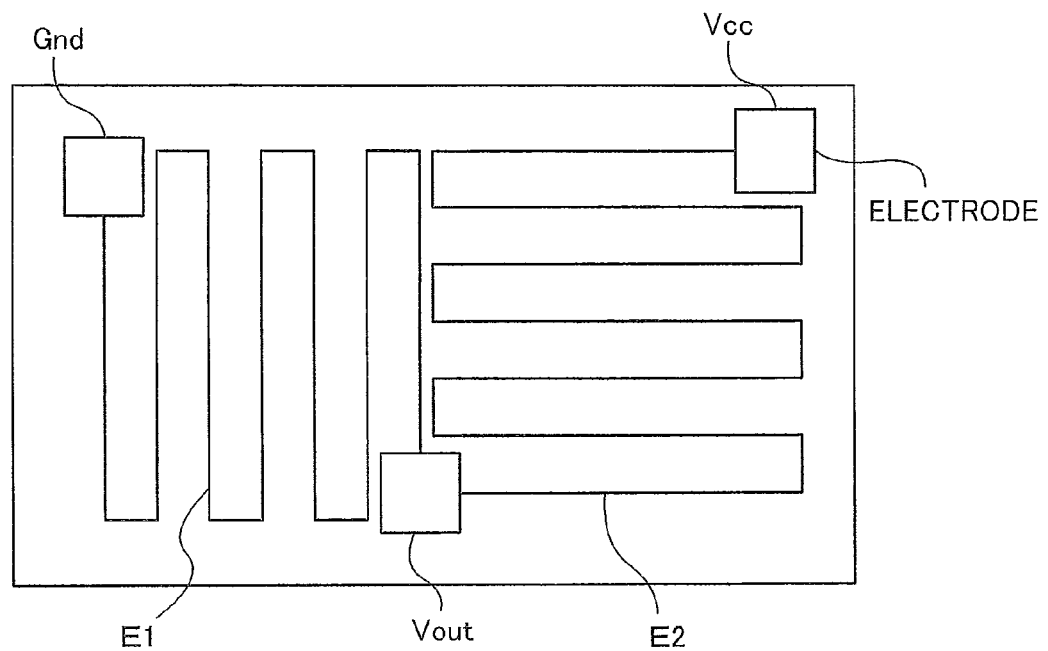
FIG. 7A is a diagram for illustrating an example of an MR sensor using a principle for sensing a direction of a magnetic field under intensity of a magnetic field not less than the specified intensity of the magnetic field.
Figure 7B:
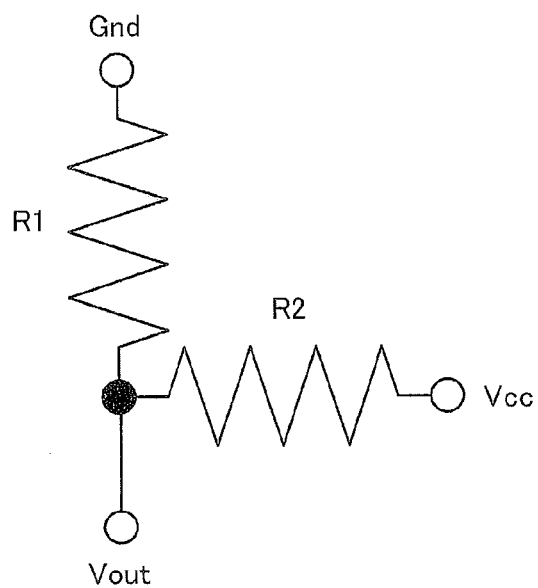
FIG. 7B is a diagram for illustrating a configuration of the MR sensor shown in FIG. 7A as an equivalent circuit.

FIG. 7A is a diagram for illustrating an example of the MR sensor using a principle for sensing a direction of a magnetic field under intensity of a magnetic field not less than the specified intensity of the magnetic field. FIG. 7B is a diagram for illustrating the configuration of the MR sensor shown in FIG. 7A as an equivalent circuit.

In the thin-film ferromagnetic metal of the MR sensor shown in FIG. 7A, a first element E1 that is formed so as to have a longer side in the vertical direction and a second element E2 that is formed so as to have a longer side in the horizontal direction are arranged in series.

In the thin-film ferromagnetic metal having such a shape, the magnetic field in the vertical direction, which leads to the maximum change in the resistance with respect to the first element E1, is of the minimum change in the resistance with respect to the second element E2. The resistance R1 of the first element E1 is given by an equation (2), and the resistance R2 of the second element E2 is given by an equation (3).

$$R1 = R0 - \Delta R \sin^2 \theta \quad (2)$$

$$R2 = R0 - \Delta R \cos^2 \theta \quad (3)$$

The equivalent circuit of the MR sensor having the element configuration shown in FIG. 7A is shown in FIG. 7B.

As shown in FIGS. 7A and 7B, in a case where an end of the first element E1, which is not connected to the second element E2, is set as a ground (Gnd), and an end of the second element E2, which is not connected to the first element E1, is set to have an output voltage of Vcc, an output voltage Vout at a connecting part between the first element E1 and the second element E2 is given by an equation (4).

$$Vout = (R1/(R1+R2)) \times Vcc \quad (4)$$

When the equations (2) and (3) are substituted into the equation (4) and the resultant equation is reorganized, an equation (5) is obtained.

$$Vout = Vcc/2 + \alpha \times \cos 2\theta \quad (5)$$

Herein, $\alpha = (\Delta R/(2 \times R0 - \Delta R)) \times Vcc$.

By the equation (5), the direction of the magnetic field is recognized by sensing the Vout.

FIGS. 8A to 8D are diagrams for illustrating a relationship between the change of the direction of the magnetic field and the output of the MR sensor when the magnet moves in a straight line.

As shown in FIG. 8A, the MR sensor shown in FIGS. 7A and 7B is arranged with respect to the magnet in which north poles and south poles are alternately arranged so that the intensity of the magnetic field not less than the specified intensity of the magnetic field is applied thereto with a gap L (distance between the magnet and the MR sensor), and change of the direction of the magnetic field affects a sensor surface of the MR sensor.

Then, the magnet is made to move to the left as shown in FIG. 8A, by a distance from the center of the north pole to the center of the south pole (hereinafter, referred to as a "magnetized pitch" in some cases) of λ, which is shown in FIG. 8C. In this case, the magnetic field whose direction is shown with an arrow in FIG. 8C is applied to the MR sensor according to the position of the magnet, and the direction of the magnetic field is half rotated on the sensor surface when the magnet moves by the magnetized pitch λ. Hence, a waveform of the output voltage Vout at the connecting part between the first element E1 and the second element E2 has one cycle as shown in FIG. 8D because of the equation (5), "Vout=Vcc/2+α×cos 2θ."

Figure 9A:
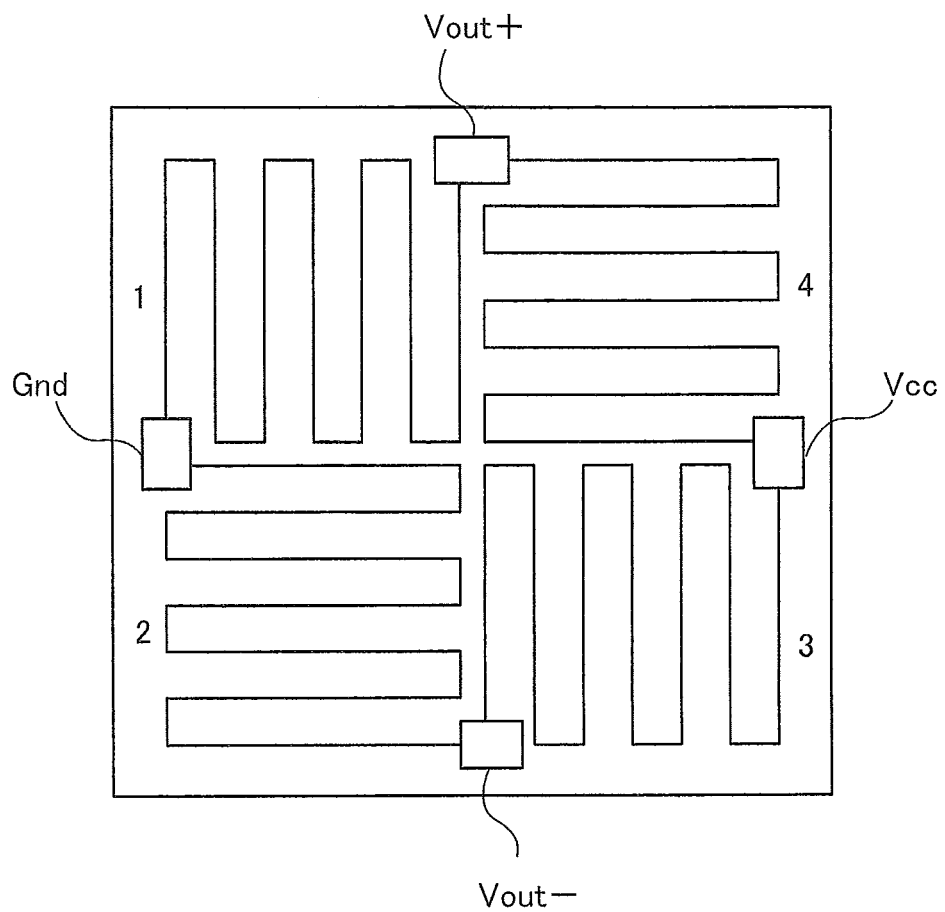
FIGS. 9A and 9B are diagrams for illustrating another example of the MR sensor.
Figure 9B:
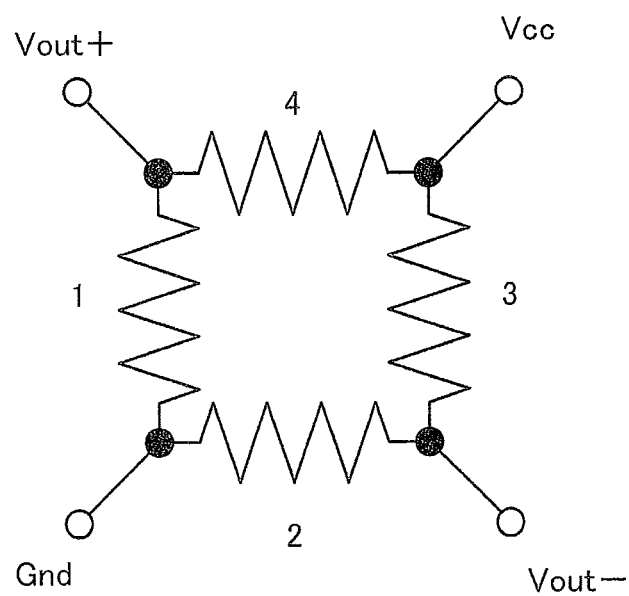

FIGS. 9A and 9B are diagrams for illustrating another example of the MR sensor.

Instead of the element configuration shown in FIGS. 7A and 7B, if an element configuration shown in FIG. 9A is adopted, a well-known configuration having a Wheatston bridge (full bridge) is achieved, as shown in FIG. 9B. Thus, by using the MR sensor having the element configuration shown in FIG. 9A, it is possible to enhance a sensing accuracy.

Description will be given for a method for sensing a moving direction of the magnet.

From the relationship between the direction of the magnetic field and the resistance of the thin-film ferromagnetic metal shown in FIGS. 6A and 6B and the equation (1), "R=R0−ΔR sin²θ," the resistance of the thin-film ferromagnetic metal is the same in both cases in which the direction of the magnetic field is made to be rotated in a clockwise direction, and in a counterclockwise direction when it is seen in FIG. 5. Accordingly, although the resistance of the thin-film ferromagnetic metal is recognized, the moving direction of the magnet is not recognized.

Figure 10:
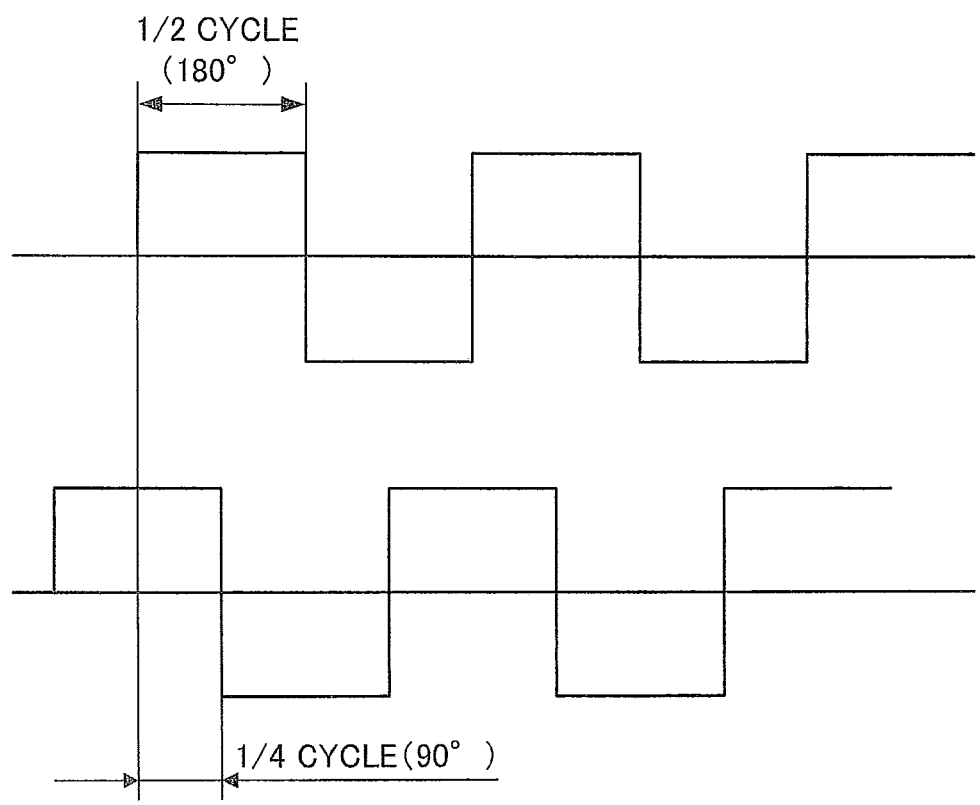
FIG. 10 is a diagram for illustrating one example of a combination of outputs used for sensing a moving direction of the magnet.

FIG. 10 is a diagram for illustrating one example of a combination of outputs used for sensing a moving direction of the magnet. As shown in FIG. 10, by combining two outputs having phase difference of a quarter cycles, the moving direction of the magnet can be sensed. In order to obtain these outputs, two MR sensors are arranged so as to have a phase relationship such as (i) and (ii) or (i) and (iv) shown in FIG. 8C.

Figure 11A:
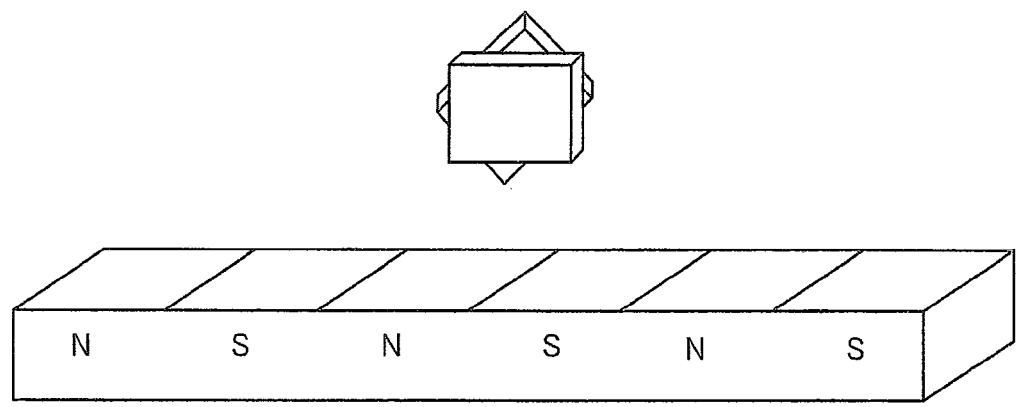
FIGS. 11A and 11B are diagrams for illustrating an example of an arrangement of the MR sensors.
Figure 11B:
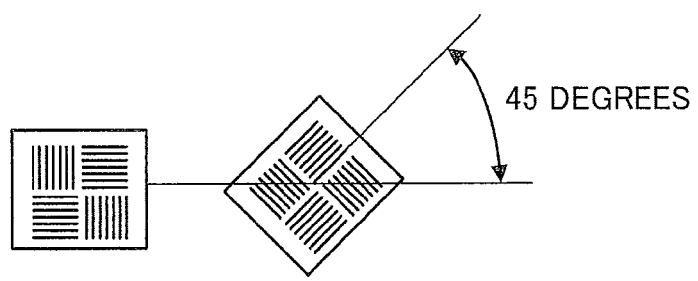

FIGS. 11A and 11B are diagrams for illustrating an example of an arrangement of the MR sensors. As shown in FIGS. 11A and 11B, two MR sensors may be stacked and one MR sensor may be arranged to have an angle of 45 degrees with respect to the other sensor.

Figure 12A:
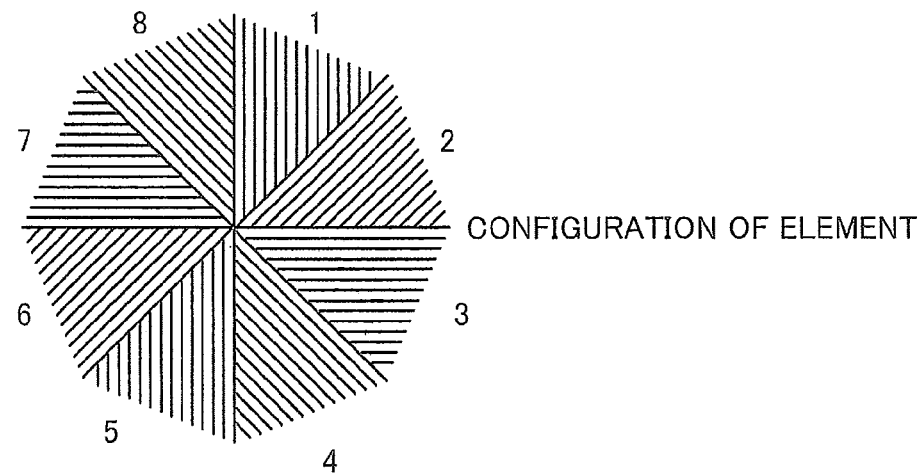
FIGS. 12A to 12C are diagrams for illustrating another example of the MR sensor.
Figure 12B:
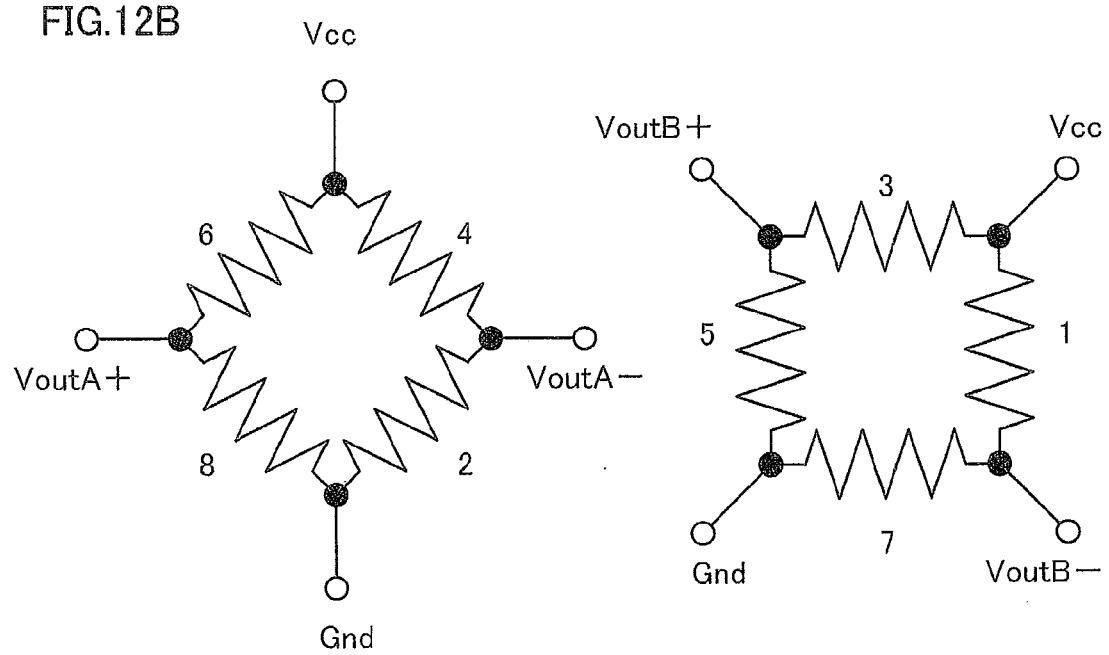
Figure 12C:
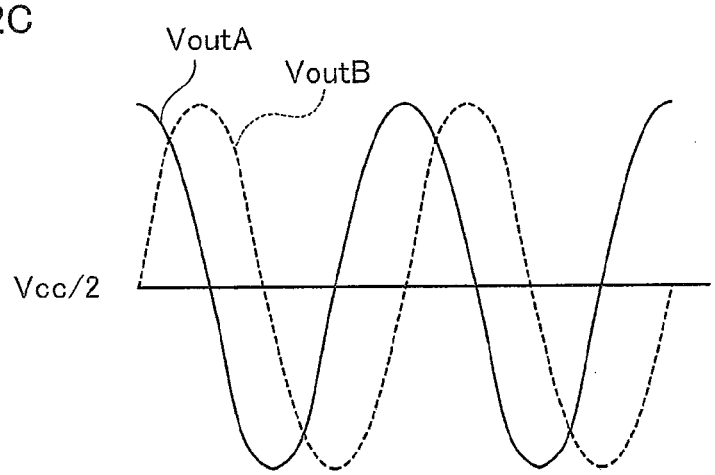

FIGS. 12A to 12C are diagrams for illustrating another example of the MR sensor. As shown in FIG. 12A, two pairs of elements each having a full-bridge configuration are formed on one substrate so as to have an angle of 45 degrees with respect to each other, and the element configuration forming an equivalent circuit shown in FIG. 12B may be considered. By this configuration, as shown in FIG. 12C, it is possible to output accurate sine and cosine waves by one MR sensor. Thus, the moving direction and the amount of the movement of the magnet with respect to the MR sensor are recognized by the output value of the MR sensor having the element configuration shown in FIGS. 12A to 12C.

In consideration of the aforementioned characteristics of the MR sensor, the MR sensor having the element configuration shown in FIGS. 12A to 12C is used as the relative angle sensor 30 in the sensing device 10 according to the exemplary embodiment. The relative angle sensor 30 is vertically arranged with respect to the outer peripheral surface of the magnet 20, and the position of the second rotary shaft 120 in the shaft direction is within the region of the magnet 20, as described above. Thus, in this case, the relative angle sensor 30 shows change of the direction of the magnetic field shown in FIG. 8C in accordance with the position of the magnet 20 by the magnetic field of the magnet 20 rotating together with the first rotary shaft 110.

As a result, when the magnet 20 moves (rotates) by the magnetized pitch λ, the direction of the magnetic field half rotates on the magnetically sensitive surface of the relative angle sensor 30 and the output values VoutA and VoutB from the relative angle sensor 30 are cosine and sine curves (waves) having phase difference of the quarter cycles as shown in FIG. 12C, respectively.

That is, when a driver rotates the steering wheel, the first rotary shaft 110 also rotates according to this rotation, and the torsion bar 130 twists. Then, the second rotary shaft 120 rotates a little later than the first rotary shaft 110. This delay appears as difference between the rotation angles of the first rotary shaft 110 and the second rotary shaft 120 that are connected to the torsion bar 130. The sensing device 10 outputs VoutA and VoutB that are the cosine and sine curves having phase difference of the quarter cycles corresponding to the difference of the rotation angle.

It should be noted that, the magnetically sensitive surface of the relative angle sensor 30 indicates a surface on which a magnetic field can be sensed in the relative angle sensor 30.

The relative angle calculator 210 of the ECU 200 calculates a relative rotation angle θt between the first rotary shaft 110 and the second rotary shaft 120 by using a following equation (6) on the basis of the output values VoutA and VoutB of the relative angle sensor 30.

$$\theta t = \arctan(VoutB/VoutA) \quad (6)$$

As described above, it is possible for the relative angle calculator 210 to recognize the relative rotation angle between the first rotary shaft 110 and the second rotary shaft 120 and the twisting direction, that is, the amount and the direction of the torque applied to the steering wheel, on the basis of the output values from the relative angle sensor 30.

When the sensing device 10 having the aforementioned configuration is attached, the flat cable cover 60, the base 50 to which the printed substrate 40 has been attached, and the flat cable 70 contained between the flat cable cover 60 and the base 50 are unitized in advance. This unit is attached to the first housing 150 to which the second rotary shaft 120 has been attached so that the convex parts 61 of the flat cable cover 60 are fitted with the concave parts 152 of the first housing 150. At this time, the base 50 is attached to the second rotary shaft 120.

As described above, it is possible to improve an assembly property by making the sensing device 10 unitizable in advance.

Next, the harness component 300 will be described.

Figure 13:
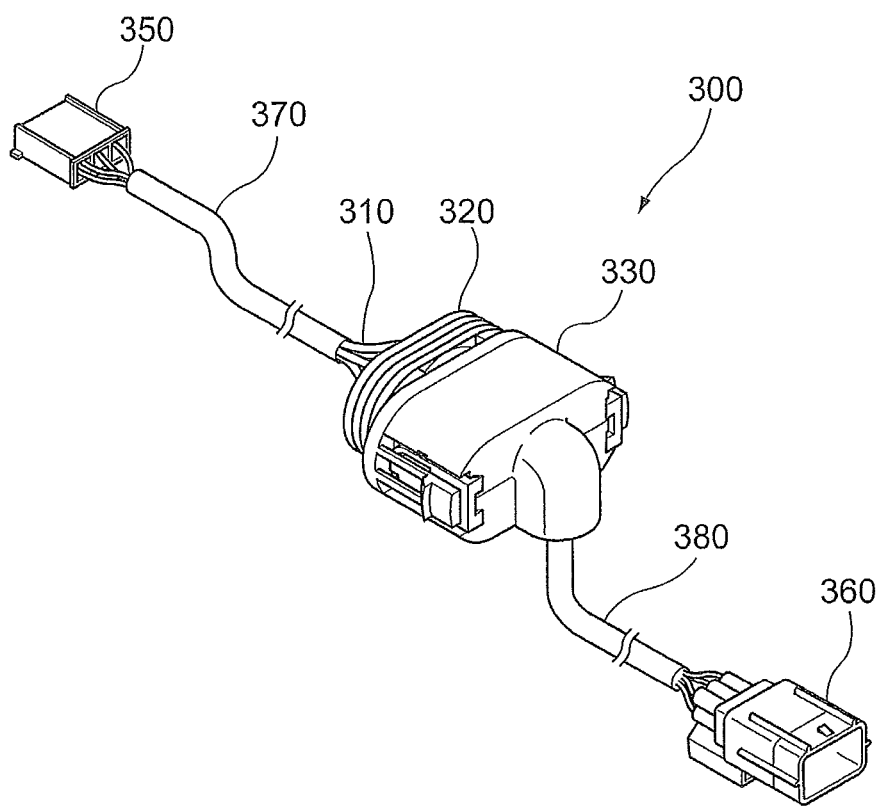
FIG. 13 is an external view of the harness component according to the exemplary embodiment.

FIG. 13 is an external view of the harness component 300 according to the exemplary embodiment.

The harness component 300 is provided with: plural electric cables 310; the grommet 320 as an example of an electric cable holding member that holds the plural electric cables 310; and the socket 330 that keeps the grommet 320 from moving. Further, the harness component 300 is provided with: a first connector 350 that is connected to one end of the plural electric cables 310; and a second connector 360 that is connected to the other end of the plural electric cables 310. Furthermore, the harness component 300 is provided with: a first cover 370 that bundles the plural electric cables 310 between the grommet 320 and the first connector 350; and a second cover 380 that bundles the plural electric cables 310 between the grommet 320 and the second connector 360.

The harness component 300 according to the exemplary embodiment has four electric cables 310, and one end of these four electric cables 310 is connected to the printed substrate 40 through the first connector 350 and the like, and the other end of these four electric cables 310 is connected to the ECU 200 through the second connector 360 and the like. The four electric cables 310 are used for electric supply from the ECU 200 to the relative angle sensor 30 and transmission of the output values from the relative angle sensor 30 to the ECU 200.

The electric cables 310 are an electric conductor such as a linearly elongated metal, which has been covered with an insulator, and have an electric conductivity. The harness component 300 according to the exemplary embodiment has four electric cables 310, one end of these four electric cables 310 is connected to the first connector 350, the other end thereof is connected to the second connector 360, and they are bundled by the first cover 370 and the second cover 380 as an insulator.

FIGS. 14A to 14C are schematic configuration views of the grommet 320 and the socket 330. FIG. 14A is a perspective view shown from the second connector 360 side, and FIG. 14B is a perspective view shown from the first connector 350 side. FIG. 14C is a cross-sectional view taken along a line XIVC-XIVC in FIG. 14A.

Figure 15A:
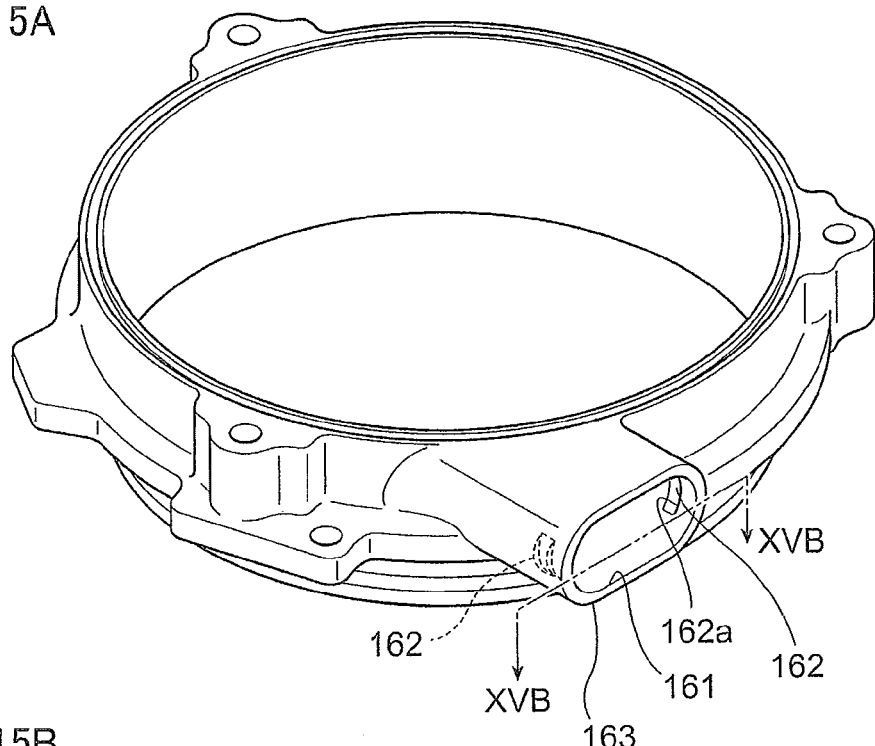
FIG. 15A is a schematic configuration diagram of a second housing.
Figure 15B:
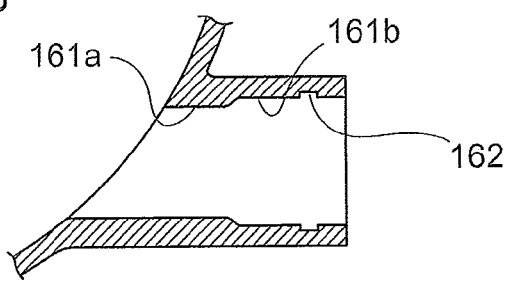
FIG. 15B is a cross-sectional view taken along the line XVB-XVB in FIG. 15A.
Figure 15C:
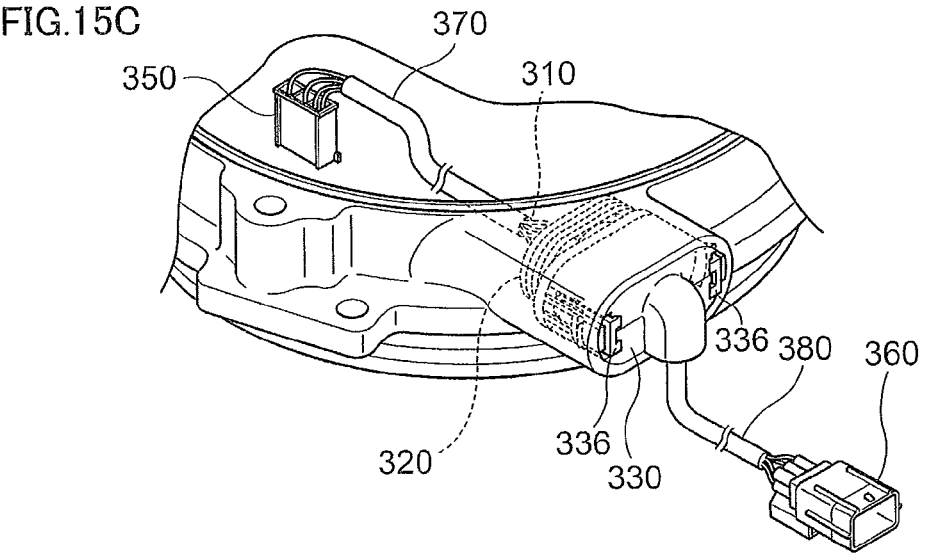
FIG. 15C is a diagram for illustrating the harness component mounted on the second housing.

FIG. 15A is a schematic view of the second housing 160. FIG. 15B is a cross-sectional view taken along a line XVB-XVB in FIG. 15A. FIG. 15C is a diagram for illustrating the harness component 300 mounted on the second housing 160.

The grommet 320 includes an elliptic cylindrical part 321 that is approximately formed into an elliptic cylinder, and a cylindrical part 322 that is formed into a cylinder. In the elliptic cylindrical part 321, electric cable holes 323 that are formed in a cylindrical direction for making the electric cables 310 pass therethrough are formed. Here, the number of the electric cable holes 323 is the same as the number of the electric cables 310 (in the exemplary embodiment, four electric cable holes 323 are formed). On the outer peripheral surface of the elliptic cylindrical part 321, plural projections 324 (three projections in the exemplary embodiment) that project from the outer peripheral surface to the outside are provided in the cylindrical direction (hole direction of the electric cable holes 323 (hereinafter, referred to as "electric cable hole direction" in some cases)) throughout the whole periphery in the peripheral direction. The outermost peripheral part of the projection 324 has larger size than the inner communication hole 161a of the communication hole 161 of the second housing 160. The outer peripheral surface of the elliptic cylindrical part 321 has the same as or a little bit smaller than the inner peripheral surface of a peripheral wall 163 forming the inner communication hole 161a of the communication hole 161 of the second housing 160. Thus, in a state of being fitted with the second housing 160, by making the projections 324 projecting from the outer peripheral surface to the outside pressed by the peripheral wall 163, the elliptic cylindrical part 321 as a whole elastically deforms to the inner side. Accordingly, the grommet 320 seals the inner communication hole 161a of the communication hole 161 of the second housing 160, and presses the electric cables 310 inserted into the electric cable holes 323 at a peripheral parts of the electric cable holes 323, which suppress movement of the electric cables 310. It should be noted that, the grommet 320 is formed by vulcanizing an elastic material such as rubber, and formed into the aforementioned shape.

The socket 330 has a pair of divided components that is able to be divided in a direction intersecting with the hole direction of the communication hole 161 of the second housing 160. In the exemplary embodiment, the pair is able to be divided in the shaft direction, and includes a lower component 340 that is arranged on the lower side, and an upper component 331 that is arranged on the upper side in FIG. 14A. Further, the socket 330 has plural detachment preventing components 336 (two detachment preventing components 336 in the exemplary embodiment) that are arranged between the lower component 340 and the upper component 331, and that prevent the socket 330 from being detached from the communication hole 161 of the second housing 160. The socket 330 is formed by injection molding of a resin and formed into a certain shape that will be described later. Further, the socket 330 functions as an example of an external member that is arranged at a position external to the grommet 320 in the communication hole 161 of the second housing 160.

The lower component 340 has a supporting part 341 that supports the upper component 331, and an elliptic cylindrical part 342 that is formed into an elliptic cylinder and in which a through hole 342a for making the plural electric cables 310 bundled by the second cover 380 pass therethrough is formed at the central part. The lower component 340 has, on both sides of the ellipse in the long side direction, two crescent cylindrical parts 343 that project outside from the end surface opposite to the side where the supporting part 341 of the elliptic cylindrical part 342 is arranged so as to be formed into a crescent cylinder. These supporting part 341, the elliptic cylindrical part 342 and the crescent cylindrical parts 343 are arrayed in this order from the second connector 360 side in the electric cable hole direction.

In the supporting part 341, a concave part 341a with which a later-described convex part 332 of the upper component 331 is fitted and a supporting surface 341b that supports a later-described lower surface 333 of the upper component 331 are formed. Two concave parts 341a and two supporting surfaces 341b are formed in the long side direction of the ellipse of the elliptic cylindrical part 342.

Further, in the supporting part 341, an electric cable passage 344 that is a passage for the plural electric cables 310 bundled by the second cover 380 is formed at the central part in the long side direction of the ellipse of the elliptic cylindrical part 342. The electric cable passage 344 has a placement surface 344a on which the lower part of the plural electric cables 310 bundled by the second cover 380 is placed, and is sectioned by two regulation walls 344b that regulate movement of the electric cables 310 toward the long side direction of the ellipse of the elliptic cylindrical part 342. The placement surface 344a in the electric cable hole direction is formed into a shape as shown in FIGS. 1A and 1B so that the part on the elliptic cylindrical part 342 side is parallel to the electric cable hole direction, the end part on the second connector 360 side extends toward the direction of one end of the shaft direction (downward in FIGS. 1A and 1B) and a part therebetween is formed into a shape like a mound rising toward the direction of the other end of the shaft direction (upward in FIGS. 1A and 1B).

The elliptic cylindrical part 342 includes hooks 390 at both ends in the long side direction of the ellipse. Each of the hooks 390 is basically a plate section formed into an elliptic cylinder, projects from the end surface on the supporting part 341 side toward the supporting part 341 side in the electric cable hole direction, and elastically deforms in the long side direction, that is, the direction intersecting with the direction for dividing the lower component 340 and the upper component 331. The hooks 390 are formed so that the outer surfaces thereof extend along the outer peripheral surface of the elliptic cylindrical part 342. Each of the hooks 390 includes an inclined surface 391 that is inclined with respect to the electric cable hole direction so as to project outside from the outer peripheral surface of the elliptic cylinder forming the elliptic cylindrical part 342, and a vertical surface 392 that is a surface spreading from the terminal end of the inclined surface 391 toward the inner side in the long side direction so as to be parallel to the long side direction, that is, a surface vertical to the electric cable hole direction, which are arranged in the middle thereof in the electric cable hole direction. Between the initial end of the inclined surface 391 and the main body of the elliptic cylindrical part 342, in order to make the inclined surface 391 and the vertical surface 392 elastically deform easily in the long side direction, a long hole 393 is formed.

In the supporting part 341 of the lower component 340, concave parts 345 for the hooks 390, which are concave so as not to interfere with the hooks 390 even if the hooks 390 elastically deform by a desired amount, are formed around the hooks 390.

The upper component 331 has a supported part 334 that is supported by the supporting part 341 of the lower component 340, and a guiding part 335 that guides the plural electric cables 310 arranged at a position outside the supported part 334 and bundled by the second cover 380 so that the plural electric cables 310 extend toward the direction of one end of the shaft direction (downward in FIG. 14A).

On a lower surface 333 that is a surface on one end side in the shaft direction (surface on the lower side in FIG. 14A) in the supported part 334 of the upper component 331, two convex parts 332 that project from the lower surface 333 toward the direction of one end of the shaft direction and that are formed into a cylinder are arranged in the long side direction of the ellipse of the elliptic cylindrical part 342. In addition, at the central part in the long side direction of the ellipse of the elliptic cylindrical part 342 on the lower surface 333, an electric cable passage (not shown) that forms a passage for the plural electric cables 310 bundled by the second cover 380 together with the electric cable passage 344 of the lower component 340 is formed. This electric cable passage is formed so as to make a space for making the plural electric cables 310 bundled by the second cover 380 pass through a space between the electric cable passage and the electric cable passage 344 of the lower component 340 in a state where the upper component 331 is attached to the lower component 340 and the lower surface 333 of the upper component 331 and the supporting surface 341b of the lower component 340 are in contact with each other.

In the supported part 334, concave parts 331a for the hooks 390, which are concave so as not to interfere with the hooks 390 even if the hooks 390 elastically deforms by a desired amount, are formed around the hooks 390.

The outer peripheral surfaces of the supported part 334 of the upper component 331 and the supporting part 341 of the lower component 340 are formed so as to have the same size as the outer peripheral surface of the elliptic cylindrical part 342 in a state where the convex parts 332 of the upper component 331 are fitted with the concave parts 341a of the lower component 340 and the lower surface 333 of the upper component 331 and the supporting surface 341b of the lower component 340 are in contact with each other.

The guiding part 335 projects outside from the end surface on the side opposite to the side where the grommet 320 of the supported part 334 is arranged, curves from the end surface toward the direction of one end of the shaft direction (downward in FIG. 14A), and covers a surrounding area of the plural electric cables 310 bundled by the second cover 380 in three directions. That is, a wall is not provided at a section facing the placement surface 344a of the electric cable passage 344 so as to form a passage together with the electric cable passage 344 of the lower component 340, and one end (lowermost part in FIG. 14A) in the shaft direction is open.

Each of the detachment preventing components 336 is arranged between corresponding one of the hooks 390 provided on both sides in the long side direction of the ellipse of the socket 330, and corresponding one of the concave parts 345 of the lower component 340 and corresponding one of the concave parts 331a of the upper component 331. The detachment preventing components 336 are an example of a deformation preventing component that is arranged inside the hook 390 in a state where the hook 390 is fitted with the concave part 162 formed in the second housing 160, thus preventing elastic deformation of the hook 390. Each of the detachment preventing components 336 has a base 336a that extends in the electric cable hole direction and that is formed into a rectangular parallelepiped, and a curved part 336b that extends toward the electric cable passage 344 from the end of the base 336a located on the outer side in the electric cable hole direction.

The base 336a has a lower projection 336c that projects from one end surface in the shaft direction (lower end surface in FIGS. 14A and 14B) to the lower side (lower component 340 side), an upper projection 336d that projects from the other end surface in the shaft direction (upper end surface in FIGS. 14A and 14B) to the upper side, and an inner projection 336e that projects from the end surface on the electric cable passage 344 side in the long side direction of the ellipse toward the electric cable passage 344. Each of these lower projection 336c, upper projection 336d and inner projection 336e has an inclined surface that is inclined with respect to the electric cable hole direction, and a vertical surface that extends from the terminal end of the inclined surface so as to be parallel to the direction vertical to the electric cable hole direction.

The curved part 336b has the inclined surface that is inclined with respect to the long side direction of the ellipse of the socket 330 at the tip and on the inner side in the electric cable hole direction. In the curved part 336b, a concave part 336f that is concave from the tip is formed at the central part of the curved part 336b in the shaft direction.

The harness component 300 having the aforementioned configuration is assembled as described below.

That is, first, the electric cables 310 are inserted into the plural electric cable holes 323 formed in the grommet 320. Then, an adhesive material is applied to the inner side of the cylindrical part 322 of the grommet 320, and positioning is conducted so that the plural electric cables 310 are prevented from moving with respect to the grommet 320. Further, the plural electric cables 310 are bundled by the first cover 370 and the second cover 380.

Then, the plural electric cables 310 bundled by the second cover 380 arranged on the cylindrical part 322 side of the grommet 320 are made to pass through the through hole 342a of the elliptic cylindrical part 342 of the lower component 340 of the socket 330, and are placed on the placement surface 344a of the electric cable passage 344 of the lower component 340. Thereafter, the upper component 331 is attached to the lower component 340. That is, the convex parts 332 of the upper component 331 are fitted with the concave parts 341a of the lower component 340, so that the lower surface 333 of the upper component 331 is made to come into contact with the supporting surface 341b of the lower component 340. As a result, the plural electric cables 310 bundled by the second cover 380 are guided toward the lower direction by the guide part 335 of the upper component 331, as shown in FIG. 13. In other words, in the harness component 300 according to the exemplary embodiment, the plural electric cables 310 bundled by the second cover 380 are pressed by the upper component 331 and the lower component 340, and thereby the plural electric cables 310 are curved downward in the direction perpendicular to the electric cable hole direction that is the direction intersecting with the hole direction of the electric cable hole 323 of the grommet 320 (electric cable hole direction). In addition, in the inside of the socket 330, the plural electric cables 310 bundled by the second cover 380 are made to be curved by the electric cable passage 344 of the lower component 340 and the supported part 334 of the upper component 331 so as to be formed into a mound that is raised upward in FIG. 13. It should be noted that, since the adhesive material is applied onto the inner side of the cylindrical part 322 of the grommet 320, even if any force is applied to the plural electric cables 310 when the upper component 331 of the socket 330 is fitted with the lower component 340, displacement of the electric cables 310 is suppressed.

Then, the tip of the plural electric cables 310 bundled by the second cover 380 is connected to the second connector 360. On the other hand, another tip of the plural electric cables 310 bundled by the first cover 370 arranged on the side opposite to the side where the cylindrical part 322 of the grommet 320 is arranged is connected to the first connector 350.

The harness component 300 is attached to the electric power steering apparatus 100 as described below.

That is, the first rotary shaft 110, the second rotary shaft 120, the sensing device 10 and the like are attached to the first housing 150 and the second housing 160, and the first connector 350 is made to pass through the communication hole 161 formed in the second housing 160 before the third housing 170 is attached. Then, the grommet 320 and the socket 330 are pushed until the projections 324 of the grommet 320 are fitted with the inner peripheral surface of the communication hole 161 and the hooks 390 of the socket 330 are fitted with the concave parts 162 formed in the second housing 160. When the socket 330 is inserted into the communication hole 161, the inclined surfaces 391 of the hooks 390 elastically deform since the inclined surfaces 391 come into contact with the surrounding wall of the communication hole 161 of the second housing 160, and thereafter, when the socket 330 is further inserted thereinto, the inclined surfaces 391 are fitted with the concave parts 162 of the second housing 160 and recover from the deformation state. The grommet 320 moves to the inner side against frictional force generated between the grommet 320 and the peripheral wall 163 of the communication hole 161, since the surface on the side where the cylindrical part 322 is arranged in the elliptic cylindrical part 321 is pressed by the crescent cylindrical part 343 of the socket 330. As described above, the grommet 320 and the socket 330 are mounted on the second housing 160. Then, each of the detachment preventing components 336 is inserted into a space between the corresponding hook 390, and the concave part 345 of the lower component 340 and the concave part 331a of the upper component 331. Further, the first connector 350 is inserted into the terminal of the flat cable cover 60 and the second connector 360 is inserted into the terminal of the ECU 200.

On the other hand, in a case where the harness component 300 is detached, after the first connector 350 is detached from the terminal of the flat cable cover 60, the grommet 320 and the socket 330 may be detached from the communication hole 161 of the second housing 160 by pulling out the detachment preventing components 336 and pulling the hooks 390 of the socket 330 from the outside of the second housing while the hooks 390 are made to elastically deform to the inner side. Since the concave part 336f is formed in the detachment preventing component 336, it is possible to detach the detachment preventing component 336 easily if a tip of a tool (such as a flathead screwdriver) is inserted into the concave part 336f, for example. Thereafter, the first connector 350 is pulled out from the communication hole 161 of the second housing 160, and the harness component 300 is detached.

In the harness component 300 that is configured as described above and is mounted on the second housing 160, when the grommet 320 is fitted with the second housing 160, the inside of the housing 140 is mainly sealed with the projections 324 of the grommet 320. In addition, the electric cable hole 323 is elastically deformed so that the diameter thereof is reduced due to the wall 163 around the communication hole 161 of the second housing 160 pressing the projections 324 of the grommet 320, and thereby the plural electric cables 310 are held more strongly. The plural electric cables 310 are bonded by the adhesive material applied on the inner side of the cylindrical part 322 of the grommet 320. Inside the socket 330, the plural electric cables 310 are bent in a chevron shape by the upper component 331 and the lower component 340 of the socket 330, and outside the housing 140, bent in a downward direction orthogonal to the electric cable hole direction. With these things, after attachment is performed, even though a force is exerted on the plural electric cables 310 bundled by the second cover 380 from the outside of the housing 140, the force hardly reaches the portion where the grommet 320 holds the electric cables 310, and accordingly, movement of the electric cables 310 with respect to the grommet 320 is suppressed. For example, even if the plural electric cables 310 bundled by the second cover 380 are pulled in a direction of one end portion of a shaft direction (downward direction in FIG. 1) at the outside of the housing 140, since, at the inside of the socket 330, the electric cables 310 are pressed by the upper component 331 and the lower component 340 of the socket 330 and are deformed into the chevron shape to protrude in a direction of the other end portion of the shaft direction (upward direction in FIG. 1), the force hardly reaches the portion where the grommet 320 holds the electric cables 310. It should be noted that the size in a radial direction of the cylindrical part 322 of the grommet 320 is allowed to be elastically deformed to be large in the electric cable hole direction since the crescent cylindrical part 343 of the socket 330 and an inner surface of the through hole 342a of the elliptic cylindrical part 342 are set to have a gap therebetween and the through hole 342a of the elliptic cylindrical part 342 is positioned in the electric cable hole direction of the cylindrical part 322, and thereby the diameter of the electric cable hole 323 of the grommet 320 is reduced.

Further, since each of the detachment preventing components 336 is inserted between the hook 390 and the concave part 345 for the hook of the lower component 340 and the concave part 331a for the hook of the upper component 331, the possibility that the hooks 390 of the socket 330 are deformed inward is suppressed. Each of the lower projection 336c, the upper projection 336d and the inner projection 336e has the inclined surface and the vertical surface to facilitate insertion of the detachment preventing component 336 while making the detachment preventing components 336 themselves be hardly detached. In addition, since the vertical surface 392 of the hook 390 of the socket 330 contacts the vertical surface 162a of the concave part 162 of the second housing 160, detachment of the socket 330 and the grommet 320 from the second housing 160 is suppressed. Consequently, even though a force is exerted on the plural electric cables 310 bundled by the second cover 380 from the outside of the housing 140, since the grommet 320 hardly detaches from the communication hole 161, the possibility that the electric cables 310 detach from the first connector 350 or the connecting terminal 62 into which the first connector 350 is inserted is broken is suppressed.

Moreover, the lower projection 336c of the detachment preventing component 336, which is inserted between the hook 390 and the concave part 345 for the hook of the lower component 340 and the concave part 331a for the hook of the upper component 331, presses the lower component 340 downwardly, and the upper projection 336d of the detachment preventing component 336 presses the upper component 331 upwardly to make the upper component 331 and the lower component 340 easily contact the inner peripheral surface of the peripheral wall 163 forming the inner communication hole 161. This suppresses wear of the upper component 331 and the lower component 340 due to frequent and strong contact with the inner peripheral surface of the peripheral wall 163 forming the inner communication hole 161.

Still further, even in the case where the harness component 300 is carried as a single unit, a worker who attaches the harness component 300 can easily perform attachment without caution to the length of the electric cables 310 between the grommet 320 and the first connector 350 because the electric cables 310 are held so as not to move with respect to the grommet 320.

Figure 16A:
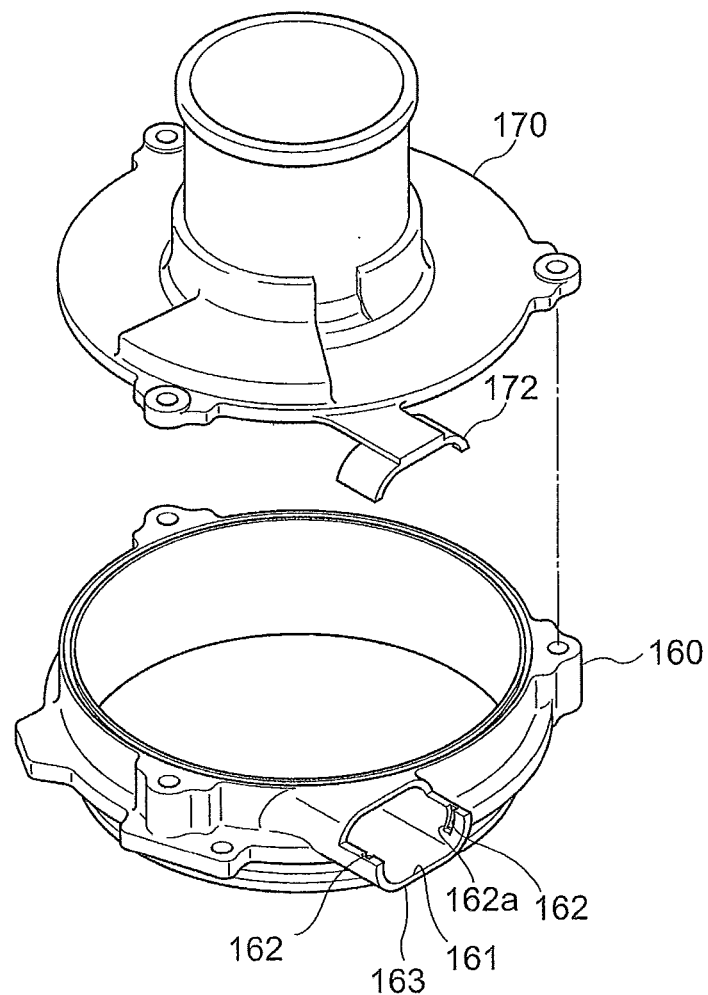
FIGS. 16A and 16B are diagrams illustrating the housing in another exemplary embodiment.
Figure 16B:
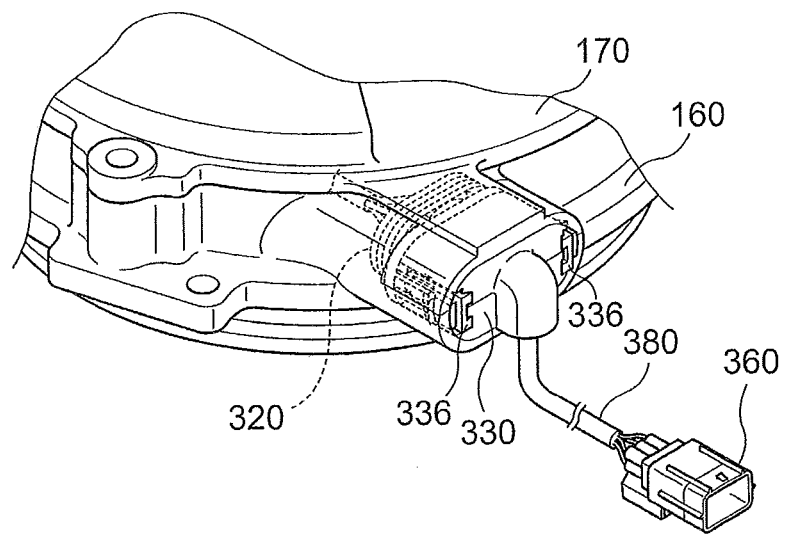

FIGS. 16A and 16B are diagrams illustrating another exemplary embodiment in which the housing 140 is modified. As shown in FIGS. 16A and 16B, part or all of the outer communication hole 161b having been described with reference to FIG. 2 and FIGS. 15A to 15C may be formed with the second housing 160 and the third housing 170. In other words, by fixing the third housing 170 to the second housing 170 with a bolt or the like, the second housing 160 and the third housing 170 may form the outer communication hole 161a in cooperation with each other. That is, as shown in FIG. 16A, a wall surface of the outer communication hole 161b in the second housing 160 on the other end portion side of the shaft direction (upper side in FIG. 1) is removed to open the outer communication hole 161b. On the other hand, the third housing 170 is provided with an extending part 172 that extends in the electric cable hole direction outwardly from a joining surface with the second housing 160.

When the harness component 300 is attached to the electric power steering apparatus 100, similar to the aforementioned exemplary embodiment, the grommet 320, the lower component 340 and the upper component 331 of the socket 330 are mounted on the second housing 160, the first connector 350 is inserted into the terminal of the flat cable cover 60, and thereafter, the third housing 170 is attached to the second housing 160. Accordingly, as shown in FIG. 16B, the top surface of the socket 330 is covered with the extending part 172 of the third housing 170. Then, the detachment preventing component 336 is inserted between the hook 390 and the concave part 345 for the hook of the lower component 340 and the concave part 331a for the hook of the upper component 331.

When the harness component 300 is detached, the top surface of the socket 330 is opened by removing the third housing 170 from the second housing 160. Consequently, it becomes possible to remove the socket 330 and the grommet 320 from the second housing 170 with ease.

<Harness Component in Another Exemplary Embodiment>

Next, another exemplary embodiment in which the aforementioned harness component 300 is modified will be described. The harness component 300 according to the exemplary embodiment has a socket 300 and a detachment preventing component 336 different from those of the harness component 300 according to the aforementioned exemplary embodiment. Hereinafter, different points will be described.

Figures 17A, 17B:
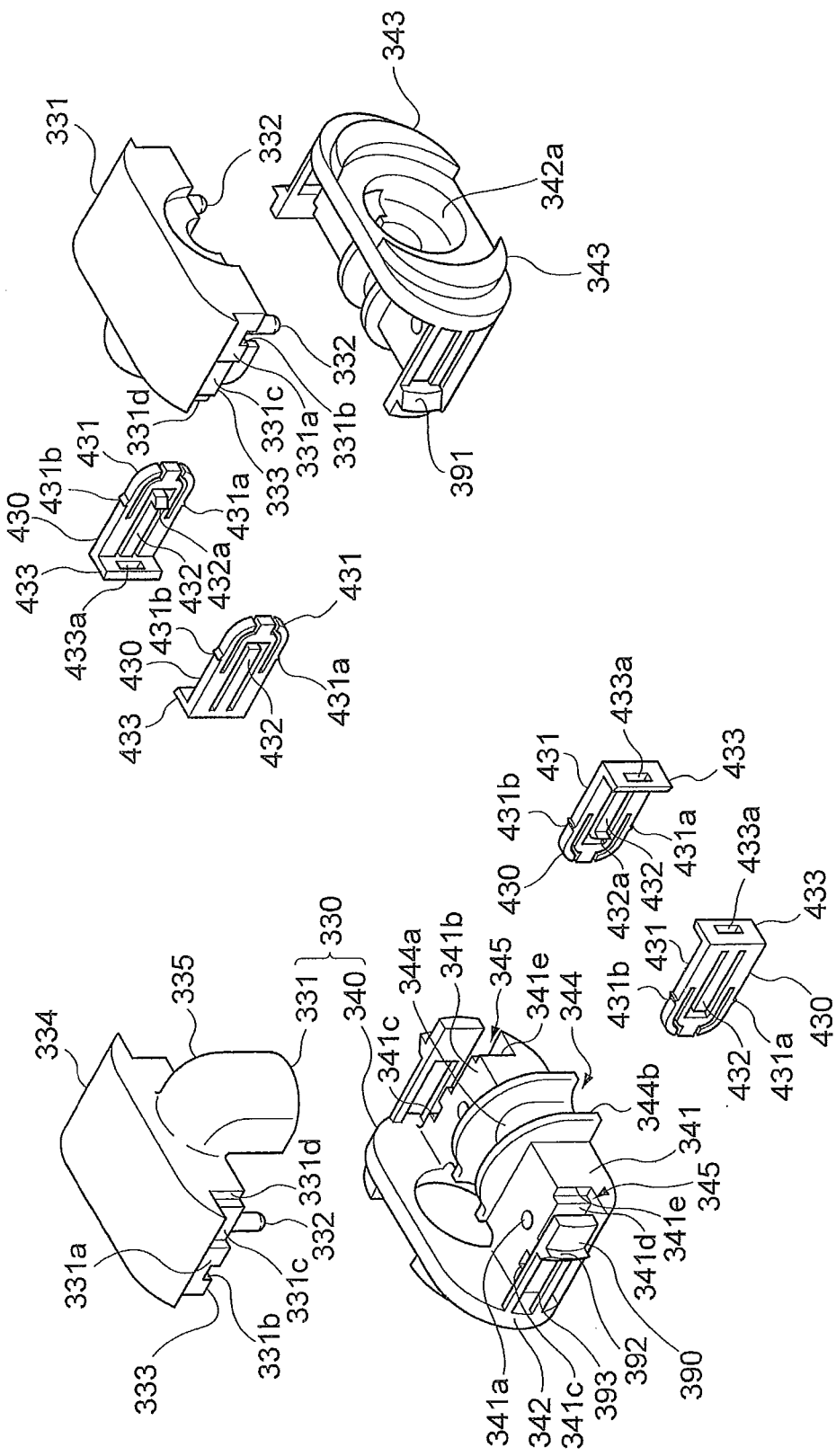
FIGS. 17A and 17B are schematic configuration diagrams of the socket and the detachment preventing components of the harness component according to still another exemplary embodiment.

FIGS. 17A and 17B are schematic configuration diagrams of the socket 330 and the detachment preventing components of the harness component 300 according to the exemplary embodiment. FIG. 17A is a perspective view shown from the second connector 360 side, and FIG. 17B is a perspective view shown from the first connector 350 side.

The socket 330 of the harness component 300 according to the exemplary embodiment is different from the socket 330 according to the aforementioned exemplary embodiment described with reference to FIGS. 14A to 14C in the following points.

That is, on a side surface of the supporting part 341 in which the concave part 345 for the hook of the lower component 340, a lower concave part 341c for projection, a lower concave part 341d for deformation and a lower concave part 341e for curved part, which are concave parts concave toward the electric cable path 344, are provided in line in the electric cable hole direction from the grommet 320 side. Meanwhile, on a side surface of the upper component 331 in which the concave part 331a for hook of the upper component 331 of the socket 330, an upper concave part 331b for projection, an upper concave part 331c for deformation and an upper concave part 331d for curved part, which are concave parts concave toward the electric cable path 344, are provided in line in the electric cable hole direction from the grommet 320 side.

The lower concave part 341c for projection and the upper concave part 331b for projection cooperate with each other to function as a concave part into which an inner projection 432a of a bending part 432 of a detachment preventing component 430 described later is fitted. Further, the lower concave part 341d for deformation and the upper concave part 331c for deformation cooperate with each other to form a space into which a tool for deforming the bending part 432 of the detachment preventing component 430 described later is inserted. Still further, the lower concave part 341e for curved part and the upper concave part 331d for curved part cooperate with each other to function as a concave part into which a curved part 433 of the detachment preventing component 430 described later is fitted.

The detachment preventing components 430 of the harness component 300 according to the exemplary embodiment are arranged between the hooks 390 provided at both ends in the long side direction of the ellipse of the socket 330 and the concave parts 345 for the hook of the lower component 340 and the concave parts 331a for the hook of the upper component 331. The detachment preventing components 430 are an example of a deformation suppressing component that is arranged inside of the hooks 390 in the state where the hooks 390 are fitted into the concave parts 162 formed in the second housing 160 to suppress elastic deformation of the hooks 390. Each of the detachment preventing component 430 includes: a base 431 that extends in the electric cable hole direction and is formed into a flat plate; the bending part 432 that is arranged inside the base 431 and is elastically deformable to bend in a direction orthogonal to the electric cable hole direction; and the curved part 433 that extends toward the electric cable passage 344 from the end portion of the base 431 located on the outer side in the electric cable hole direction.

The base 431 has a lower projection 431a that projects downward (toward the lower component 340) from one end surface in the shaft direction (lower end surface in FIGS. 17A and 17B), an upper projection 431b that projects upward (toward the upper component 331) from the other end surface in the shaft direction (upper end surface in FIGS. 17A and 17B). Each of the lower projection 431a and the upper projection 431b has an inclined surface that is inclined with respect to the electric cable hole direction and a vertical surface that extends from the terminal end of the inclined surface so as to be parallel to the direction vertical to the electric cable hole direction. In addition, in the base 431, a cutout for facilitating displacement of the upper projection 431b toward one side of the shaft direction (lower side in FIGS. 17A and 17B) and a cutout for facilitating displacement of the lower projection 431a toward the other side of the shaft direction (upper side in FIGS. 17A and 17B) are formed.

The bending part 432 is a part that is formed into a rectangular parallelepiped and projects in the electric cable hole direction from the curved part 433, and is provided with an inner projection 432a projecting toward the electric cable passage 344 at a tip end portion thereof. The inner projection 432a has an inclined surface that is inclined with respect to the electric cable hole direction and a vertical surface that extends from the terminal end of the inclined surface so as to be parallel to the direction vertical to the electric cable hole direction.

The curved part 433 is a flat-plate part, and at the center portion thereof, a through hole 433a that penetrates the curved part 433 is formed.

Figure 18:
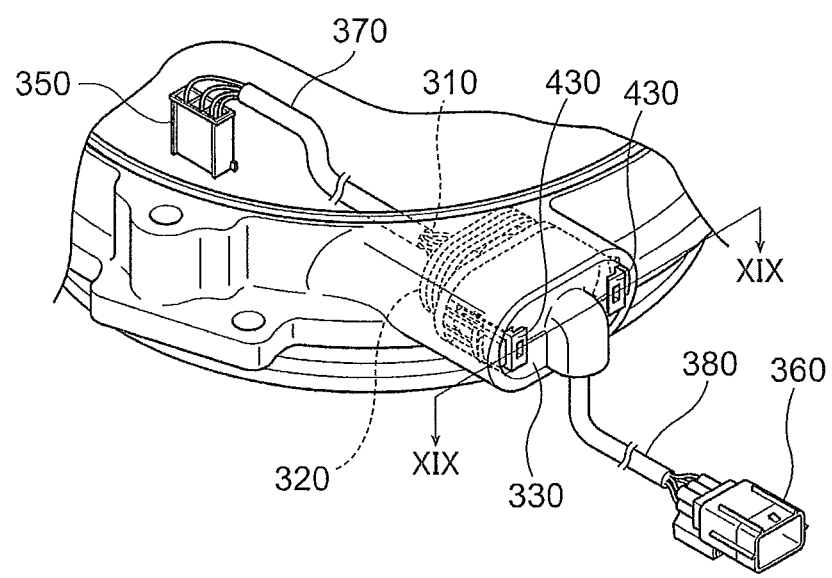
FIG. 18 is a diagram for illustrating the harness component according to the still another exemplary embodiment mounted on the second housing.

FIG. 18 is a diagram for illustrating the harness component 300 according to the exemplary embodiment mounted on the second housing 160.

Figure 19A:
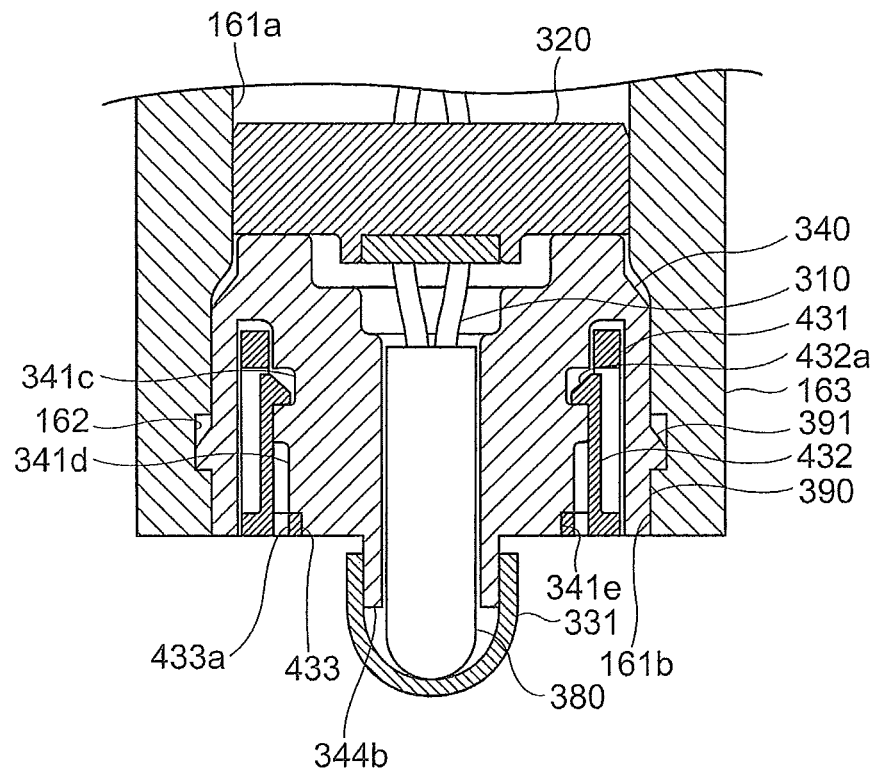
FIG. 19A is a cross-sectional view taken along the line XIX-XIX in FIG. 18.
Figure 19B:
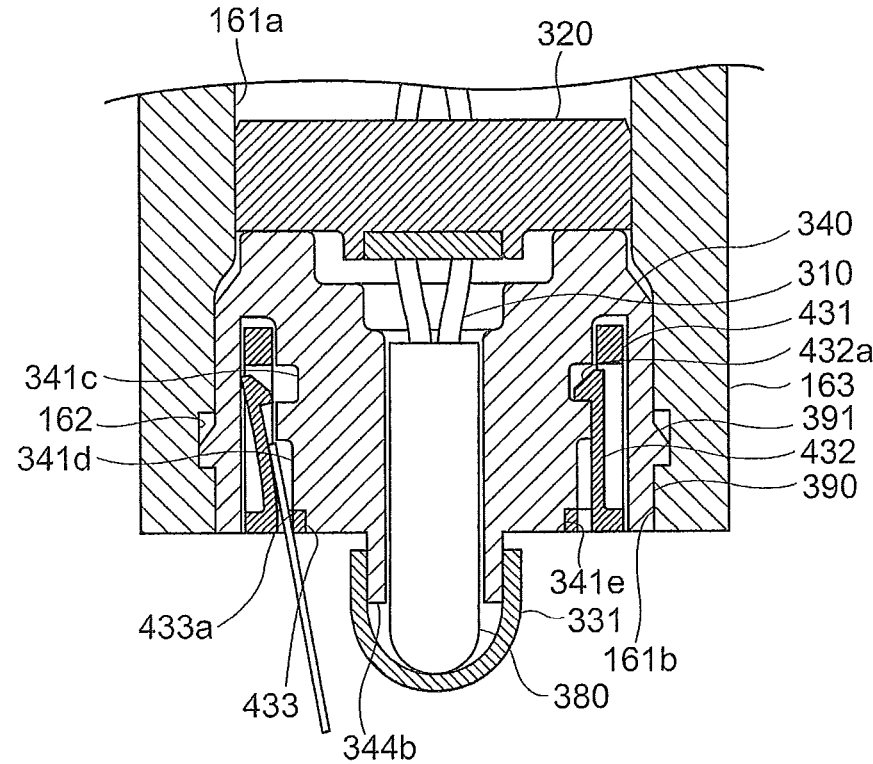
FIG. 19B is a diagram for illustrating a manner of removing the detachment preventing components.

FIG. 19A is a cross-sectional view taken along the line XIX-XIX in FIG. 18, and FIG. 19B is a diagram for illustrating a manner of removing the detachment preventing components 430.

The harness component 300 according to the exemplary embodiment is attached to the electric power steering apparatus 100 by the aforementioned manner.

However, after mounting the plural electric cables 310, the grommet 320 holding the second cover 380 that bundles the plural electric cables 310 and the socket 330 on the second housing 160, each of the detachment preventing components 430 is pressed between the concave part 345 for the hook of the lower component 340 of the socket 330 and the concave part 331a for the hook of the upper component 331. When the detachment preventing components 430 are inserted, the inclined surface of the inner projection 432a of the bending part 432 is elastically deformed due to contact with side surfaces of the lower component 340 and the upper component 331 of the socket 330, and thereafter, further inserted deeper to be fitted into the lower concave part 341c for projection and the upper concave part 331b, thereby returning from a deformed state (refer to FIG. 19A).

On the other hand, in the case of removing the harness component 300, the detachment preventing components 430 are pulled out of the socket 330. On this occasion, as shown in FIG. 19B, a tip of a tool (such as a flathead screwdriver) may be inserted through the through hole 433a formed in the curved part 433 of each of the detachment preventing component 430 to pull out the inner projection 432a of the bending part 432 while the inner projection 432a is made to elastically deform outwardly. After the detachment preventing components 430 are pulled out of the socket 330, the grommet 320 and the socket 330 may be detached from the communication hole 161 of the second housing 160 by pulling the hooks 390 of the socket 330 from the outside of the second housing 160 while the hooks 390 are made to elastically deform inwardly.

In the harness component 300 according to the exemplary embodiment as described above, each of the detachment preventing components 430 is inserted between the hook 390 and the concave part 345 for the hook of the lower component 340 and the concave part 331a for the hook of the upper component 331; therefore, inward deformation of the hooks 390 of the socket 330 is suppressed. Each of the lower projection 431a, the upper projection 431b and the inner projection 432a of the detachment preventing component 430 has the inclined surface and the vertical surface to facilitate insertion of the detachment preventing components 430 while making the detachment preventing components 430 themselves be hardly detached. In addition, since the vertical surface 392 of the hook 390 of the socket 330 contacts the vertical surface 162a of the concave part 162 of the second housing 160, detachment of the socket 330 and the grommet 320 from the second housing 160 is suppressed. Consequently, even though a force is exerted on the plural electric cables 310 bundled by the second cover 380 from the outside of the housing 140, since the grommet 320 hardly detaches from the communication hole 161, the possibility that the electric cables 310 detach from the first connector 350 or the connecting terminal 62 into which the first connector 350 is inserted is broken is suppressed.

Moreover, the lower projection 431a of the detachment preventing component 430, which is inserted between the hook 390 and the concave part 345 for the hook of the lower component 340 and the concave part 331a for the hook of the upper component 331, presses the lower component 340 downward, and the upper projection 431b of the detachment preventing component 430 presses the upper component 331 upward to make the upper component 331 and the lower component 340 easily contact the inner peripheral surface of the peripheral wall 163 forming the inner communication hole 161. This suppresses wear of the upper component 331 and the lower component 340 due to frequent and strong contact with the inner peripheral surface of the peripheral wall 163 forming the inner communication hole 161.

<Still Another Exemplary Embodiment in which Detachment Preventing Components are Modified>

Next, still another exemplary embodiment in which the detachment preventing components of the aforementioned harness component 300 are modified will be described.

Detachment preventing components 530 according to the exemplary embodiment are different from the detachment preventing components 330 having been described with reference to FIGS. 14A to 14C and the detachment preventing components 430 having been described with reference to FIGS. 17A and 17B in the following points.

FIGS. 20A and 20B are schematic configuration diagrams of the detachment preventing components 530 according to the still another exemplary embodiment. FIG. 20A is a perspective view shown from the second connector 360 side, and FIG. 20B is a perspective view shown from the first connector 350 side.

The detachment preventing components 530 according to the exemplary embodiment are an example of a deformation suppressing component that is arranged inside of the hooks 390 in the state where the hooks 390 are fitted into the concave parts 162 formed in the second housing 160 to suppress elastic deformation of the hooks 390. The detachment preventing component 530 is also an example of a covering component that covers the socket 330.

The detachment preventing component 530 includes detachment preventing parts 540 at both ends in the long side direction thereof, the detachment preventing parts 540 being arranged between the hooks 390 provided at both ends in the long side direction of the ellipse of the socket 330 and the concave parts 345 for the hook of the lower component 340 and the concave parts 331a for the hook of the upper component 331. In addition, the detachment preventing component 530 includes a covering part 550 that covers an opening portion of the communication hole 161 of the second housing 160 and the guiding part 335 of the socket 330, and the above-described two detachment preventing parts 540 protrude from one end surface in the electric cable hole direction of the covering part 550.

Each of the detachment preventing parts 540 includes: a base 541 that extends in the electric cable hole direction and that is formed into a flat plate; a bending part 542 that is arranged inside the base 541 and is elastically deformable to bend in a direction orthogonal to the electric cable hole direction; and a curved part 543 that extends toward the electric cable passage 344 from the end of the base 541 located on the outer side in the electric cable hole direction.

The base 541 has a lower projection 541a that projects downward (toward the lower component 340) from one end surface in the shaft direction (lower end surface in FIGS. 20A and 20B), an upper projection 541b that projects upward (toward the upper component 331) from the other end surface in the shaft direction (upper end surface in FIGS. 20A and 20B). Each of the lower projection 541a and the upper projection 541b has an inclined surface that is inclined with respect to the electric cable hole direction and a vertical surface that extends from the terminal end of the inclined surface so as to be parallel to the direction vertical to the electric cable hole direction. In addition, in the base 431, a cutout for facilitating displacement of the upper projection 541b toward one side of the shaft direction (lower side in FIGS. 20A and 20B) and a cutout for facilitating displacement of the lower projection 541a toward the other side of the shaft direction (upper side in FIGS. 20A and 20B) are formed.

The bending part 542 is a part that is formed into a rectangular parallelepiped and projects in the electric cable hole direction from the covering part 550, and is provided with an inner projection 542a projecting toward the electric cable passage 344 at a tip end portion thereof. The inner projection 542a has an inclined surface that is inclined with respect to the electric cable hole direction and a vertical surface that extends from the terminal end of the inclined surface so as to be parallel to the direction vertical to the electric cable hole direction.

The curved part 543 is a part that is formed into a rectangular parallelepiped and extends in the long side direction.

The covering part 550 includes: a flat plate part 551 that is a plate-like portion having an outer shape larger than the end surface of the wall 163 in the electric cable hole direction, the wall 163 surrounding and forming the communication hole 161 in the second housing 160; a guiding-part covering part 552 that is formed along the shape of the guiding part 335 of the socket 330 to cover the guiding part 335.

On the edge around the flat plate part 551, a projection part 551a projecting in the direction in which the detachment preventing part 540 projects is provided. In addition, in the flat plate part 551, a through hole 551b that penetrates the flat plate part 551 is formed at a location closer to the electric cable passage 344 than the bending part 542 of each of the detachment preventing part 540. At the upper portion of the through hole 551b and at the side portion opposite to the electric cable passage 344, a hole cover 551c that projects in the electric cable hole direction from the flat plate part 551 is provided.

Figure 21:
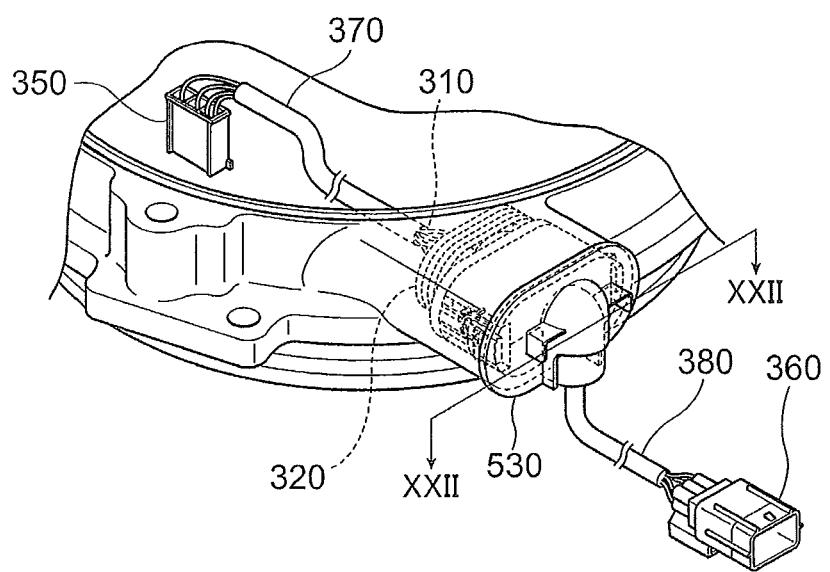
FIG. 21 is a diagram for illustrating the harness component including the detachment preventing components according to the still another exemplary embodiment mounted on the second housing.

FIG. 21 is a diagram for illustrating the harness component 300 having the detachment preventing component 530 according to the still another exemplary embodiment mounted on the second housing 160.

Figure 22A:
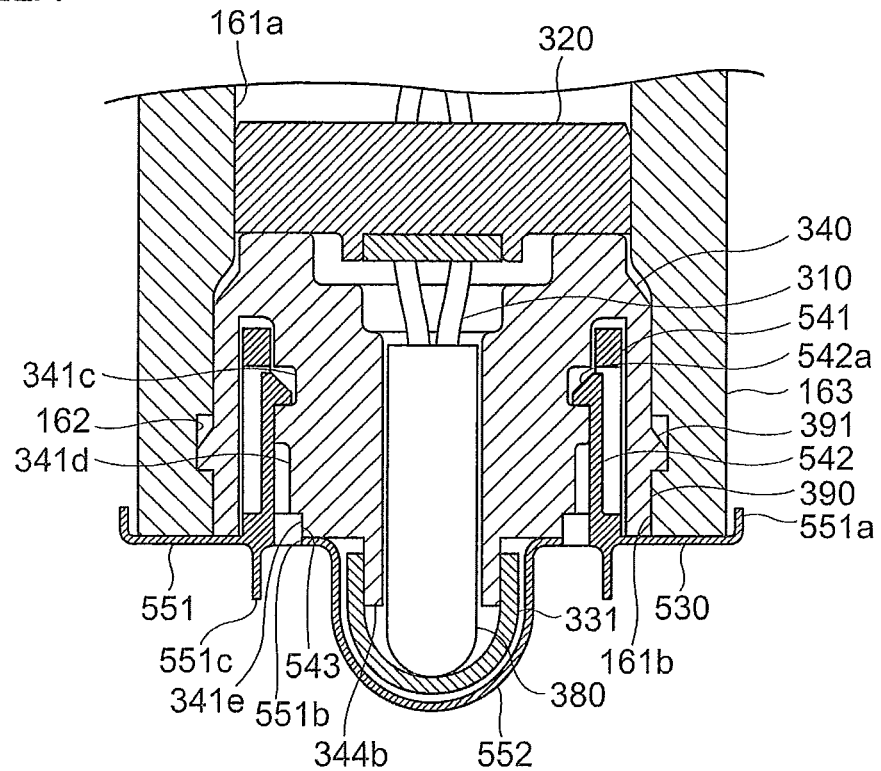
FIGS. 22A and 22B are cross-sectional views taken along the line XXII-XXII in FIG. 21.
Figure 22B:
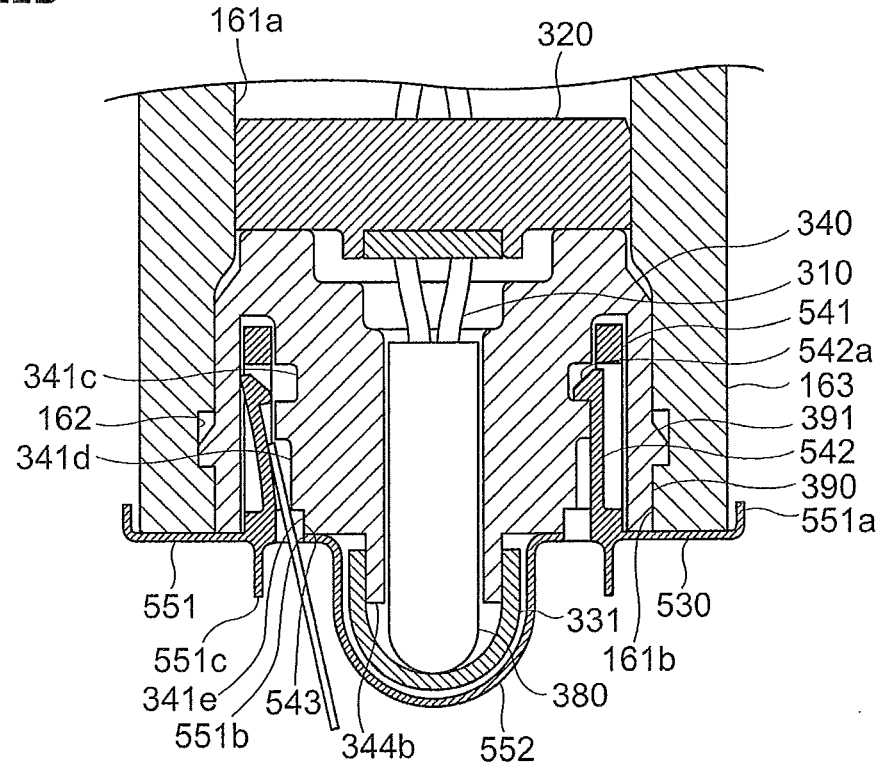

FIGS. 22A and 22B are cross-sectional views taken along the line XXII-XXII in FIG. 21.

The harness component 300 having the detachment preventing component 530 according to the exemplary embodiment is attached to the electric power steering apparatus 100 by the aforementioned manner.

However, after mounting the plural electric cables 310, the grommet 320 holding the second cover 380 that bundles the plural electric cables 310 and the socket 330 on the second housing 160, the detachment preventing component 530 is pressed so that each of the detachment preventing parts 540 of the detachment preventing component 530 is fitted between the concave part 345 for the hook of the lower component 340 of the socket 330 and the concave part 331a for the hook of the upper component 331. When the detachment preventing component 530 is inserted, the inclined surface of the inner projection 542a of the bending part 542 is elastically deformed due to contact with side surfaces of the lower component 340 and the upper component 331 of the socket 330, and thereafter, further inserted deeper to be fitted into the lower concave part 341c for projection and the upper concave part 331b, thereby returning from a deformed state (refer to FIG. 22A).

On the other hand, in the case of removing the harness component 300, the detachment preventing component 530 is pulled out of the socket 330. On this occasion, as shown in FIG. 22B, a tip of a tool (such as a flathead screwdriver) may be inserted through the through hole 551b formed in the covering part 550 of the detachment preventing component 530 to pull out the detachment preventing component 530 while the inner projection 542a of the bending part 542 is made to elastically deform outwardly. After the detachment preventing component 530 is pulled out of the socket 330, the grommet 320 and the socket 330 may be detached from the communication hole 161 of the second housing 160 by pulling the hooks 390 of the socket 330 from the outside of the second housing 160 while the hooks 390 are made to elastically deform inwardly.

In the harness component 300 according to the exemplary embodiment as described above, each of the detachment preventing parts 540 of the detachment preventing component 530 is inserted between the hook 390 and the concave part 345 for the hook of the lower component 340 and the concave part 331a for the hook of the upper component 331; therefore, inward deformation of the hooks 390 of the socket 330 is suppressed. Each of the lower projection 541a, the upper projection 541b and the inner projection 542a of the detachment preventing part 540 of the detachment preventing component 530 has the inclined surface and the vertical surface to facilitate insertion of the detachment preventing component 530 while making the detachment preventing component 530 itself be hardly detached. In addition, since the vertical surface 392 of the hook 390 of the socket 330 contacts the vertical surface 162a of the concave part 162 of the second housing 160, detachment of the socket 330 and the grommet 320 from the second housing 160 is suppressed. Consequently, even though a force is exerted on the plural electric cables 310 bundled by the second cover 380 from the outside of the housing 140, since the grommet 320 hardly detaches from the communication hole 161, the possibility that the electric cables 310 detach from the first connector 350 or the connecting terminal 62 into which the first connector 350 is inserted is broken is suppressed.

Moreover, the lower projection 541a of the detachment preventing component 530, which is inserted between the hook 390 and the concave part 345 for the hook of the lower component 340 and the concave part 331a for the hook of the upper component 331, presses the lower component 340 downward, and the upper projection 541b of the detachment preventing component 530 presses the upper component 331 upward to make the upper component 331 and the lower component 340 easily contact the inner peripheral surface of the peripheral wall 163 forming the inner communication hole 161. This suppresses wear of the upper component 331 and the lower component 340 due to frequent and strong contact with the inner peripheral surface of the peripheral wall 163 forming the inner communication hole 161.

Further, since the detachment preventing component 530 according to the exemplary embodiment includes the covering part 550 having the flat plate part 551 with an outer shape larger than the opening portion of the communication hole 161 of the second housing 160, it is possible to suppress entrance of a liquid, such as water, from a gap between the wall 163 surrounding and forming the communication hole 161 of the second housing 160 and the socket 330.

Still further, the detachment preventing component 530 according to another exemplary embodiment is a component integrally formed with the detachment preventing parts 540 and the covering part 550. Accordingly, by use of the detachment preventing component 530, it is possible to realize suppression of a drop of the socket 330 and the grommet 320 from the second housing 160, suppression of entrance of a liquid, such as water, from a gap between the wall 163 surrounding and forming the communication hole 161 of the second housing 160 and the socket 330, or the like with a simple configuration just employing a single pair of detachment preventing components 530 to be attached.

<Still Another Exemplary Embodiment in which Socket is Modified>

Next, still another exemplary embodiment in which the aforementioned socket of the harness component 300 is modified will be described.

The socket 600 according to the exemplary embodiment is different from the socket 330 having been described with reference to FIGS. 14A to 14C in the following points.

Figure 23A:
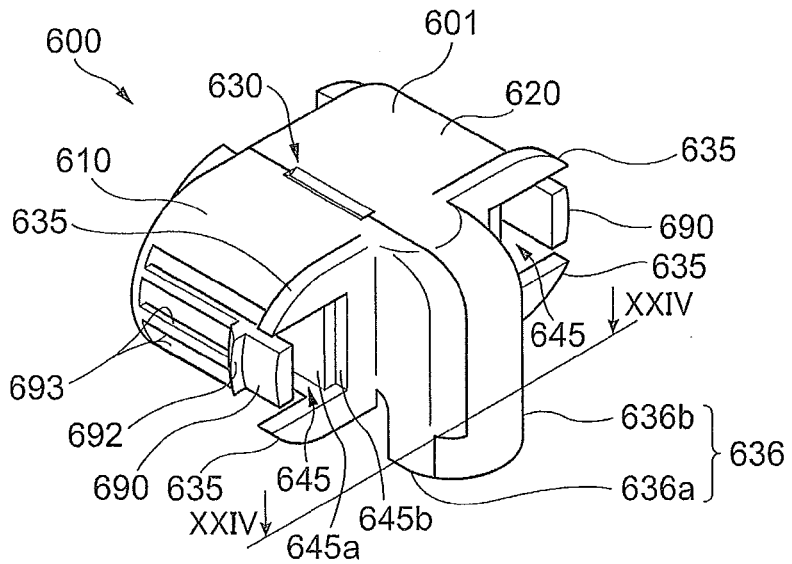
FIGS. 23A to 23D are schematic configuration diagrams of the socket according to still another exemplary embodiment.
Figure 23B:
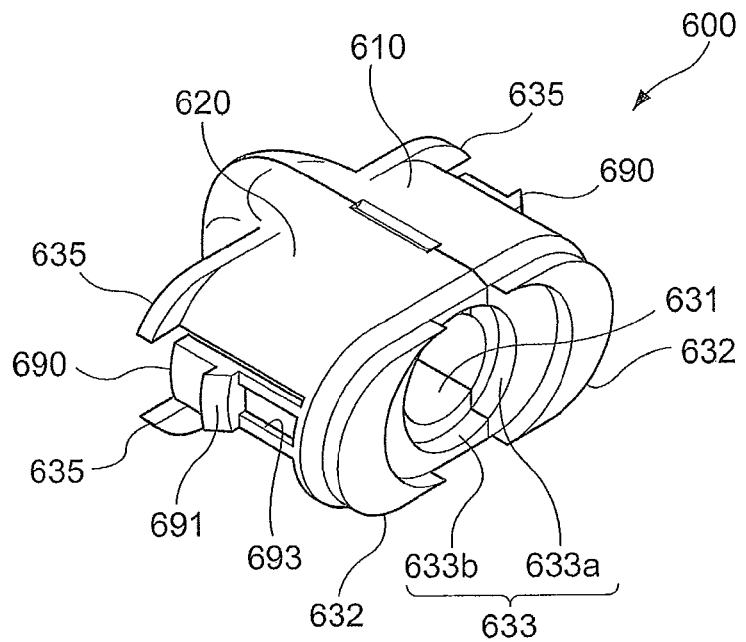
Figure 23C:
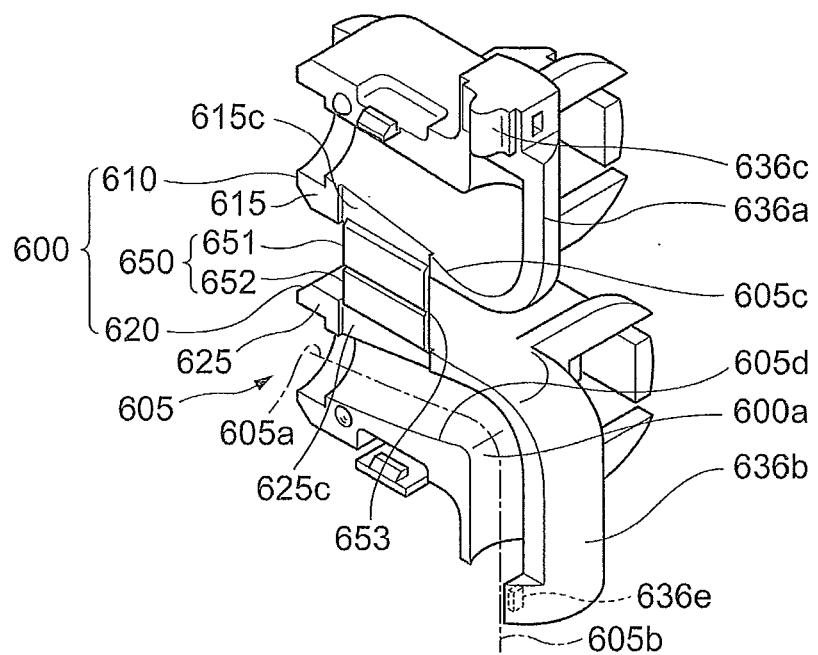
Figure 23D:
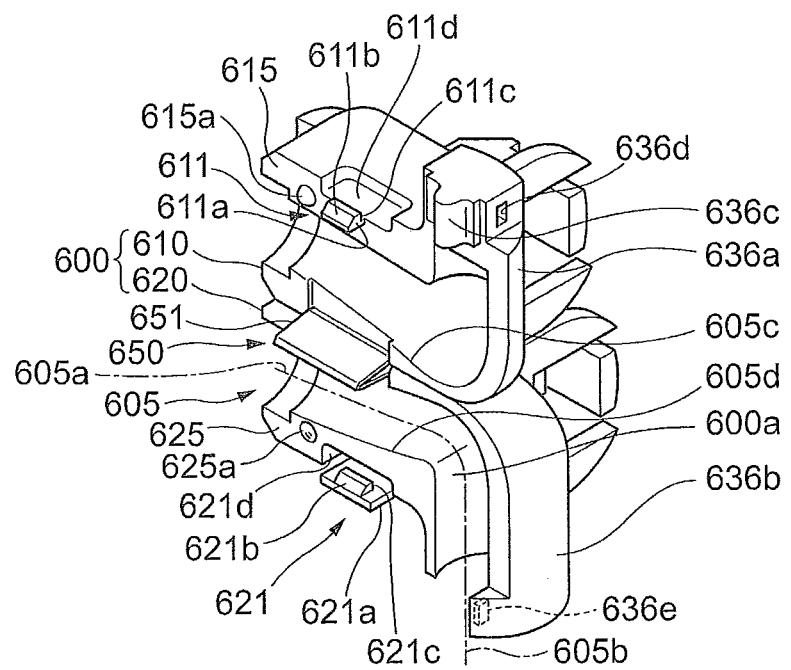

FIGS. 23A to 23D are schematic configuration diagrams of the socket 600 according to the exemplary embodiment. FIG. 23A is a perspective view shown from the second connector 360 side, FIG. 23B is a perspective view shown from the first connector 350 side, FIG. 23C is a diagram illustrating an unconnected state of the socket 600, and FIG. 23D is a diagram illustrating a state between the unconnected state and a connected state of the socket 600.

Figure 24:
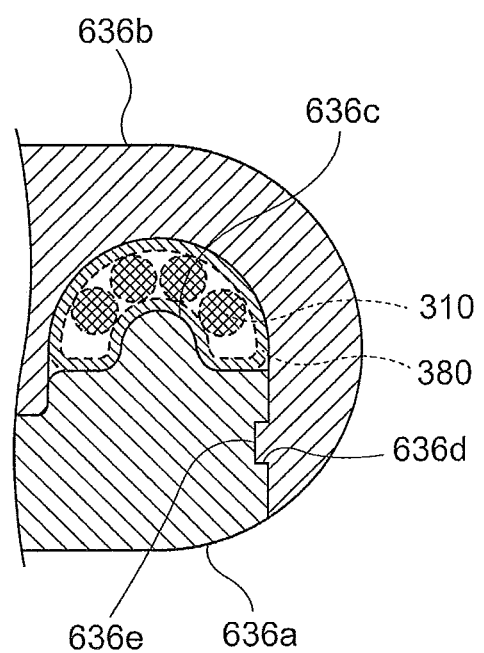
FIG. 24 is a cross-sectional view taken along the line XXIV-XXIV in FIG. 23A.

FIG. 24 is a cross-sectional view taken along the line XXIV-XXIV in FIG. 23A.

The socket 600 includes a pair of opening and closing components inside of which a through hole 605 to pass electric cables is formed and which opens and closes the through hole 605 by relatively rotating. In other words, the socket 600 is configured with a male component 610 having a protruding part 611 that protrudes from an outer surface thereof and a female component 620 having a receiving part 621 that receives a tip portion of the protruding part 611 on the outside of an outer surface thereof. Each of the male component 610 and the female component 620 has one of a pair of connecting parts 650. The male component 610 includes a male connecting part 651 of the pair of connecting parts 650 and the female component 620 includes a female connecting part 652 of the pair of connecting parts 650. The male component 610, the female component 620 and the pair of connecting parts 650 are integrally formed into a single component by injection molding.

A basic shape of the male connecting part 651 and the female connecting part 652 is like a thin plate. A joint part 653 of the male connecting part 651 and the female connecting part 652 is formed thinner than the portions of the basic shape for making it possible to fold the male connecting part 651 and the female connecting part 652 at the joint part 653 as shown in FIG. 23D, and portions located on both sides of the joint part 653 and on outer sides in the state of being folded are formed so that the thickness thereof becomes gradually thinner from the portions of the basic shape toward the joint part 653. In other words, in the state shown in FIG. 23C, the male connecting part 651 and the female connecting part 652 form a single portion like a thin plate, and at the center portion thereof, a V-shaped groove with the joint part 653 as a bottom portion is formed.

Further, a joint portion between the male component 610 and the male connecting part 651 is formed thinner than the portions of the basic shape, and thereby the male connecting part 651 arbitrarily changes an angle with respect to the male component 610 with ease. Similarly, a joint portion between the female component 620 and the female connecting part 652 is also formed thinner than the portions of the basic shape, and thereby the female connecting part 652 arbitrarily changes an angle with respect to the female component 620 with ease.

Each of the male component 610 and the female component 620 is provided with a side surface that faces the counterpart component when the protruding part 611 of the male component 610 is inserted into the receiving part 621 of the female component 620 to connect these components. Hereinafter, the side surface of the male component 610 is referred to as a male side surface 615, and the side surface of the female component 620 is referred to as a female side surface 625.

In the socket 600, when the protruding part 611 of the male component 610 is inserted into the receiving part 621 of the female component 620, and thereby these components are connected, the pair of connecting parts 650 is contained at the inner side than an outer peripheral surface of the socket 600 (state shown in FIG. 23B). Specifically, at a location upper than the through hole 605 in the male side surface 615 of the male component 610, a male connecting concave part 615c is provided, and at a location lower than the through hole 605 in the female side surface 625 of the female component 620, a female connecting concave part 625c is provided; and accordingly, the pair of connecting parts 650 is contained in a space formed by the male connecting concave part 615c and the female connecting concave part 625c.

The protruding part 611 of the male component 610 has a lateral direction portion 611a that extends in the lateral direction from the male side surface 615 toward the female component 620, and at a tip end of the lateral direction portion 611a, an inclined surface 611b that is inclined downwardly with respect to the lateral direction and a vertical surface 611c that extends from a height of a terminal end of the inclined surface 611b to a lower surface of the lateral direction portion 611a are provided. In addition, in the periphery of the location where the protruding part 611 is provided in the lower surface of the male component 610, a hollow 611d is provided.

The receiving part 621 of the female component 620 is configured with a downward portion (not shown) that extends downward from the lower surface of the female component 620 and a lateral direction portion 621a that extends in the lateral direction from the lower end portion of the downward portion toward the male component 610. At a tip end of the lateral direction portion 621a, an inclined surface 621b that is inclined upwardly with respect to the lateral direction and a vertical surface 621c that extends from a height of a terminal end of the inclined surface 621b to a top surface of the lateral direction portion 621a are formed. In addition, in the periphery of the location where the receiving part 621 is provided in the lower surface of the female component 620, a hollow 621d is provided.

The male component 610 and the female component 620 are connected by inserting the protruding part 611 of the male component 610 between the lateral direction portion 621a of the receiving part 621 and the lower surface of the female component 620. The male component 610 and the female component 620 are an example of a pair of dividable members, and in the connected state, the vertical surface 611c of the protruding part 611 of the male component 610 and the vertical surface 621c of the receiving part 621 of the female component 620 are brought into contact, and thereby rotational movement of the male component 610 with respect to the female component 620 is suppressed to maintain the connected state.

In the socket 600, in the state where the male component 610 and the female component 620 are connected, the shape of the outer peripheral surface 601 is basically and substantially like an elliptic cylinder, and inside thereof, the through hole 605 is formed at the center portion for passing the plural electric cables 310 and the plural electric cables 310 bundled by the second cover 380. The cross-sectional shape of the through hole 605 is substantially a perfect circle, and the shape in the length direction is such that one direction 605a, which is a hole direction at an end portion facing the grommet 320, and the other direction 605b, which is a hole direction at another end portion opposite to the end portion facing the grommet 320, cross each other. In the exemplary embodiment, one direction 605a and the other direction 605b are formed to be at right angles to each other. Specifically, if it is supposed that one direction 605a is same as the communication hole direction (electric cable hole direction), which is the horizontal direction, the other direction 605b is a direction heading downward. Moreover, from one end portion to the other end portion, the through hole 605 once proceeds oppositely to the other end portion and then proceeds toward the other end portion, thus curving like a dogleg. In other words, the through hole 605 is curved into a chevron shape to protrude in a direction opposite to the direction of the electric cables 310 outside of the housing 140.

The through hole 605 is formed with a male through hole concave part 605c that is inwardly dented from the male side surface 615 in the male component 610 and a female through hole concave part 605d that is inwardly dented from the female side surface 625 in the female component 620. In the state where the male component 610 and the female component 620 are connected, the socket 600 is formed so that the male side surface 615 of the male component 610 and the female side surface 625 of the female component 620 do not coincide with a hole center of the through hole 605, and the male side surface 615 and the female side surface 625 are located closer to the male component 610 than the hole center of the through hole 605. Accordingly, the size (region) of the female through hole concave part 605d of the female component 620 is larger than the size (region) of the male through hole concave part 605c of the male component 610. On the wall surrounding the male through hole concave part 605c of the male component 610 and the female through hole concave part 605d of the female component 620, an acute angle portion 600a bent to an acute angle is provided at a location in the male component 610 and the female component 620 below the through hole 605 for bending the through hole 605 like a dogleg.

The socket 600 includes, on one end surface side in the cylindrical direction (end surface side facing the grommet 320), two crescent cylindrical parts 632 on both sides of the ellipse in the long side direction, the two crescent cylindrical parts 632 projecting outwardly in the cylindrical direction from the end surface, and a cylinder part 633 that is dented from the end surface at the center portion is formed. One crescent cylindrical part 632 is provided to each of the male component 610 and the female component 620. The cylinder part 633 is formed by a male cylinder concave part 633a inwardly dented from one end surface of the male component 610 in the cylindrical direction and a female cylinder concave part 633b inwardly dented from one end surface of the male component 610 in the cylindrical direction.

The size of the outer peripheral surface 601 of the socket 600 in the elliptic cylindrical shape is equal to or a little bit smaller than that of the inner peripheral surface of a peripheral wall 163 forming the inner communication hole 161a of the communication hole 161 of the second housing 160. Each of the male component 610 and the female component 620 is provided with two protruding parts 635 that protrude outside of the outer peripheral surface 601 in the elliptic cylindrical shape in the lateral direction at the other end portion (opposite to the end portion facing the grommet 320) in the outer peripheral surface 601 having the elliptic cylindrical shape.

At the end portion of the socket 600 opposite to the end portion facing the grommet 320, a guiding part 636 that guides the plural electric cables 310 bundled by the second cover 380 to the other direction 605b is provided. The guiding part 636 is a wall covering a periphery of the through hole 605 from a portion subsequent to a dogleg-like curve to the other end portion, and is configured with a male guiding part 636a of the male component 610 and a female guiding part 636b of the female component 620. The male guising part 636a of the male component 610 is provided with a protruding part 636c that protrudes toward the hole center of the through hole 605 to reduce a passage area of the through hole 605. In addition, the male guiding part 636a and the female guiding part 636b are provided with a concave part 636d and a convex part 636e, respectively, and the concave part 636d and the convex part 636e are fitted with each other when the male component 610 and the female component 620 are connected.

Additionally, the protruding part 636c of the male guiding part 636a in the male component 610 is a portion protruding from a wall surface forming the through hole 605 toward the hole center of the through hole 605, and a cross-sectional shape of a tip end thereof is an arc as shown in FIG. 24. A size of a gap in the radial direction between the tip end of the protruding part 636c and a wall surface of the female guiding part 636b that forms the through hole 605 and faces the tip end of the protruding part 636c is set substantially equal to the diameter size of the electric cable 310. Consequently, when the male component 610 and the female component 620 are connected, the socket 600 presses the plural electric cables 310 bundled by the second cover 380 so as to be arranged in a circumferential direction by the tip end of the protruding part 636c of the male guiding part 636a and the wall surface in the female guiding part 636b that forms the through hole 605. In such a way, the protruding part 636c of the male guiding part 636a and the wall surface in the female guiding part 636b that forms the through hole 605 function as a pressing part that presses the electric cables 310 at the outside of the communication hole 161 of the housing 140.

Further, the hole size of the through hole 605 between the end portion facing the grommet 320 and the portion where the protruding part 636c is provided to the male component 610 is larger than the size of four electric cables 310, and is also larger than the outer shape of the second cover 380 in the state of bundling the plural electric cables 310. Therefore, four electric cables 310 bundled by the second cover 380 easily move within the through hole 605.

At the portions facing the grommet 320 in the male side surface 615 and the female side surface 625, a convex part 615a and a concave part 625a are provided to be fitted with each other when the male component 610 and the female component 620 are connected. When the male component 610 and the female component 620 are connected, due to the convex part 615a and the concave part 625a being fitted with each other, the possibility that the male component 610 and the female component 620 mutually shift in surface directions of the male side surface 615 and the female side surface 625, respectively, is suppressed.

The socket 600 includes hooks 690 at both ends in the long side direction thereof. Each of the hooks 690 projects from one end portion side (end portion facing the grommet 320) in the cylindrical direction of the outer peripheral surface 601 in the elliptic cylindrical shape toward the protruding portion 635 in one direction 605a in the through hole 605, and elastically deforms in the long side direction. In other words, one hook 690 is provided to each of the male component 610 and the female component 620. Each of the hooks 690 is formed so that the outer surface thereof extends along the outer peripheral surface 601 having the elliptic cylindrical shape. Each of the hooks 690 includes an inclined surface 691 that is inclined with respect to the electric cable hole direction so as to project outwardly from the outer peripheral surface 601 having the elliptic cylindrical shape, and a vertical surface 692 that is a surface spreading from the terminal end of the inclined surface 691 toward the inner side in the long side direction so as to be parallel to the long side direction, that is, a surface vertical to the electric cable hole direction. Two long holes 693 are formed between the starting end of the inclined surface 691 and the aforementioned one end portion, for enhancing elastic deformation of the inclined surface 691 and the vertical surface 692 in the long side direction.

Further, in the socket 600, concave parts 645 for the hooks 690, which are concave so as not to interfere with the hooks 690 even if the hooks 690 elastically deform by a desired amount, are formed around the hooks 690. On the side surfaces of the socket main body where the concave parts for the hooks 690 are formed, concave parts for projection (not shown), concave parts for deformation 645a, and concave parts for bending part 645b, which are dented toward the through hole 605, are provided in order from the grommet 320 side in line in the electric cable hole direction.

The socket 600 as configured above opens the through hole 605 (in the state shown in FIG. 23C) when the protruding part 611 of the male component 610 and the receiving part 621 of the female component 620 are not connected. In this state, it is possible to press the plural electric cables 310 bundled by the second cover 380 into the female through hole concave part 631b of the female component 320 from the lateral direction. Thereafter, when the protruding part 611 of the male component 610 is inserted into the receiving part 621 of the female component 620 and connected, the through hole 605 is closed. On this occasion, the plural electric cables 310 bundled by the second cover 380 are pressed by the protruding part 636c provided to the male guiding part 636a of the male component 610. Further, at this time, since the tip end of the protruding part 636c of the male guiding part 636a and the wall surface of the female guiding part 636b forming the through hole 605 press the electric cables 310 so that the four electric cables 310 in the second cover 380 are arranged in line in the circumferential direction, it becomes possible to suppress a break of the electric cables 310 due to being strongly pressed.

The harness component 300 configured as described above is assembled as will be described below.

That is, first, the electric cables 310 are inserted into the respective plural electric cable holes 323 formed in the grommet 320. Then, an adhesive material is applied to the inner side of the cylindrical part 322 of the grommet 320, and positioning is conducted so that the plural electric cables 310 are prevented from moving with respect to the grommet 320. Further, the plural electric cables 310 are bundled by the first cover 370 and the second cover 380. Thereafter, the tip ends of the plural electric cables 310 bundled by the first cover 370 are connected to the first connector 350 and the tip ends of the plural electric cables 310 bundled by the second cover 380 are connected to the second connector 360.

Then the plural electric cables 310 bundled by the second cover 380 are pressed into the female through hole concave part 605d of the female component 620 in the socket 600 in the state of being unconnected from the lateral direction. On this occasion, the plural electric cables 310 bundled by the second cover 380 are pressed to be arranged along the shape of the through hole 605, and come out of the other end portion of the through hole 605.

It should be noted that the plural electric cables 310 bundled by the second cover 380 may be pressed into the female through hole concave part 605d of the female component 620 before tip ends of the electric cables 310 bundled by the second cover 380 are connected to the second connector 360.

The harness component 300 is attached to the electric power steering apparatus 100 as will be described below.

That is, the first rotary shaft 110, the second rotary shaft 120, the sensing device 10 and the like are attached to the first housing 150 and the second housing 160, and the first connector 350 is made to pass through the communication hole 161 formed in the second housing 160 before the third housing 170 is attached. Then, the grommet 320 and the socket 600 are pushed until the projections 324 of the grommet 320 are fitted with the inner peripheral surface of the communication hole 161 and the hooks 690 of the socket 600 are fitted with the concave parts 162 formed in the second housing 160.

When the socket 600 is inserted into the communication hole 161, the inclined surfaces 691 of the hooks 690 elastically deform since the inclined surfaces 691 come into contact with the surrounding wall of the communication hole 161 of the second housing 160, and thereafter, when the socket 600 is further inserted thereinto, the inclined surfaces 691 are fitted with the concave parts 162 of the second housing 160 and recover from the deformation state. The grommet 320 moves to the inner side against frictional force generated between the grommet 320 and the peripheral wall 163 of the communication hole 161, since the surface on the side where the cylindrical part 322 is arranged in the elliptic cylindrical part 321 is pressed by the crescent cylindrical part 632 of the socket 600. As described above, the grommet 320 and the socket 600 are mounted on the second housing 160. Then, the detachment preventing components 336 having been described with reference to FIGS. 14A to 14C, the detachment preventing components 430 having been described with reference to FIGS. 17A and 17B, or the detachment preventing components 530 having been described with reference to FIGS. 20A and 20B are inserted into the concave parts 645 for the hooks 690. Further, the first connector 350 is inserted into the terminal provided inside the flat cable cover 60 and the second connector 360 is inserted into the terminal of the ECU 200.

On the other hand, in a case where the harness component 300 is detached, after the first connector 350 is detached from the terminal of the flat cable cover 60, the grommet 320 and the socket 600 may be detached from the communication hole 161 of the second housing 160 by pulling out the detachment preventing components 336 (or any of 430 and 530) and pulling the hooks 690 of the socket 600 from the outside of the second housing while the hooks 690 are made to elastically deform to the inner side. Thereafter, the first connector 350 is pulled out from the communication hole 161 of the second housing 160, and the harness component 300 is detached.

In the harness component 300 that is configured as described above and is mounted on the second housing 160, when the grommet 320 is fitted with the second housing 160, the inside of the housing 140 is mainly sealed with the projections 324 of the grommet 320. In addition, the electric cable hole 323 is elastically deformed so that the diameter thereof is reduced due to the wall 163 around the communication hole 161 of the second housing 160 pressing the projections 324 of the grommet 320, and thereby the plural electric cables 310 are held more strongly. The plural electric cables 310 are bonded by an adhesive material applied on the inner side of the cylindrical part 322 of the grommet 320. The plural electric cables 310 bundled by the second cover 380 that passes the through hole 605 are bent like a dogleg in the socket 600, and outside the housing 140, exit in a downward direction orthogonal to the electric cable hole direction. Further, the electric cables 310 bundled by the second cover 380 are pressed by the protruding part 636c provided to the male guiding part 636a of the male component 610 at the outside of the housing 140. With these things, after attachment is performed, even though a force is exerted on the plural electric cables 310 bundled by the second cover 380 from the outside of the housing 140, the force hardly reaches the portion where the grommet 320 holds the electric cables 310 (electric cable holding portion), and accordingly, movement of the electric cables 310 with respect to the grommet 320 is suppressed.

For example, even if the plural electric cables 310 bundled by the second cover 380 are pulled in the direction of one end portion of the shaft direction (downward direction in FIGS. 1A and 1B) at the outside of the housing 140, since the electric cables 310 are pressed by the protruding part 636c of the male component 610 in the socket 600, the electric cables 310 hardly move with respect to the socket 600. Moreover, if the electric cables 310 are supposed to move with respect to the socket 600 in the direction of one end portion of the shaft direction (downward direction in FIGS. 1A and 1B), since, inside the socket 600, the electric cables 310 are pressed by the acute angle portion 600a of the socket 600, a force causing the movement hardly reaches the portion where the grommet 320 holds the electric cables 310. It should be noted that the size in a radial direction of the cylindrical part 322 of the grommet 320 is allowed to be elastically deformed to be large in the electric cable hole direction since the crescent cylindrical part 632 of the socket 600 and an inner surface of the elliptic cylindrical part 633 are set to have a gap therebetween and the elliptic cylindrical part 633 is positioned in the electric cable hole direction of the cylindrical part 622, and thereby the diameter of the electric cable hole 323 of the grommet 320 is reduced.

Further, since the detachment preventing components 336 (or any of 430 and 530) are inserted into the concave parts 645 for the hooks, the possibility that the hooks 690 of the socket 600 are deformed inward is suppressed. In addition, since the vertical surfaces 692 of the hooks 690 of the socket 600 contact the vertical surfaces 162a of the concave parts 162 of the second housing 160, detachment of the socket 600 and the grommet 320 from the second housing 160 is suppressed. Consequently, even though a force is exerted on the plural electric cables 310 bundled by the second cover 380 from the outside of the housing 140, since the grommet 320 hardly detaches from the communication hole 161, the possibility that the electric cables 310 detach from the first connector 350 or the connecting terminal 62 into which the first connector 350 is inserted is broken is suppressed.

Further, as described above, the four electric cables 310 bundled by the second cover 380 easily move within the through hole 605 between the end portion thereof facing the grommet 320 and the portion where the male component 610 is provided with the protruding part 636c (pressing portion). Therefore, even if the harness component 300 is assembled in a state where the phases in the circumferential direction of the plural electric cables 310 are shifted between the electric cable holding portion and the socket 600 in the grommet 320 (in a twisted state), and the harness component 300 under that state is mounted on the second housing 160, the phase shift of the electric cables 310 in the circumferential direction is resolved between the electric cable holding portion of the grommet 320 and the pressing portion of the socket 600. Accordingly, if it is supposed that the harness component 300 is attached to the second housing 160 in the state where the electric cables are twisted, it is possible to suppress deterioration of sealing properties between the grommet 320 and the second housing 160 due to the twisted electric cables 310 that move the grommet 320 for resolving the twisted state. In addition, it becomes possible to soften the effect on the electric cable holding portion of the grommet 320 caused by the force from the electric cables 310 in the twisted state for trying to resolve the twisted state, and to suppress movement of the electric cables 310 with respect to the grommet 320.

Further, use of the detachment preventing components 530 having been described with reference to FIGS. 20A and 20B provides advantage as follows. That is, the flat plate part 551 of the covering part 550 of each of the detachment preventing components 530 is capable of suppressing entrance of a liquid, such as water, form a gap between the surrounding wall 163 forming the communication hole 161 in the second housing 160 and the socket 600. Still further, the guiding-part covering part 552 of the covering part 550 in each of the detachment preventing components 530 is capable of suppressing entrance of a liquid, such as water, form a gap between the male guiding part 636a of the male component 610 and the female guiding part 636b of the female component 620 in the socket 600.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relative angle sensing device comprising:
a sensor that is contained in a housing provided with a communication hole for communicating an inside and an outside thereof, and outputs an electric signal corresponding to a relative rotation angle between two rotary shafts arranged coaxially with each other;
an electric cable that transmits the electric signal outputted from the sensor to a device arranged outside of the housing;
an electric cable holding member that is fitted with the communication hole of the housing and holds the electric cable; and
an external member that is arranged at a location outer than the electric cable holding member in the communication hole of the housing, wherein
the external member comprises a pair of dividable members that is dividable in a direction intersecting a hole direction of the communication hole provided in the housing, and the external member passes the electric cable within the pair of dividable members and presses the electric cable with the pair of dividable members, and thereby changes a direction of the electric cable at the outside of the housing into the direction intersecting the hole direction.

2. The relative angle sensing device according to claim 1, wherein
a shape of a part of a passage of the electric cable within the pair of dividable members in the hole direction of the communication hole is a chevron shape to protrude in a direction opposite to the direction of the electric cable at the outside of the housing.

3. The relative angle sensing device according to claim 1, wherein
the pair of dividable members includes a convex part that is fitted with a concave part formed in the housing and dented from a surface of the communication hole.

4. The relative angle sensing device according to claim 2, wherein
the pair of dividable members includes a convex part that is fitted with a concave part formed in the housing and dented from a surface of the communication hole.

5. The relative angle sensing device according to claim 3, wherein
the convex part of the pair of dividable members is provided to be elastically deformable in a direction intersecting a dividing direction at each of both ends of the pair of dividable members in the direction intersecting the dividing direction, and the relative angle sensing device further comprises a deformation suppressing component that is arranged inside the convex part to suppress elastic deformation of the convex part when the convex part is fitted with the concave part of the housing.

6. The relative angle sensing device according to claim 4, wherein
the convex part of the pair of dividable members is provided to be elastically deformable in a direction intersecting a dividing direction at each of both ends of the pair of dividable members in the direction intersecting the dividing direction, and the relative angle sensing device further comprises a deformation suppressing component that is arranged inside the convex part to suppress elastic deformation of the convex part when the convex part is fitted with the concave part of the housing.

7. The relative angle sensing device according to claim 5, wherein
the deformation suppressing component comprises a deformation suppressing part that is arranged inside the convex part of the pair of dividable members to suppress elastic deformation of the convex part when the convex part is fitted with the concave part of the housing and a covering part that covers a gap between a surrounding wall forming the communication hole in the housing and the external member, the deformation suppressing part and the covering part being integrally formed.

8. The relative angle sensing device according to claim 6, wherein
the deformation suppressing component comprises a deformation suppressing part that is arranged inside the convex part of the pair of dividable members to suppress elastic deformation of the convex part when the convex part is fitted with the concave part of the housing and a covering part that covers a gap between a surrounding wall forming the communication hole in the housing and the external member, the deformation suppressing part and the covering part being integrally formed.

9. An electric power steering apparatus comprising:
a sensor that outputs an electric signal corresponding to a relative rotation angle between two rotary shafts arranged coaxially with each other;
a housing that contains the sensor and is provided with a communication hole for communicating an inside and an outside thereof;
an electric cable that transmits the electric signal outputted from the sensor to a device arranged outside of the housing;
an electric cable holding member that is fitted with the communication hole of the housing and holds the electric cable; and an external member that is arranged at a location outer than the electric cable holding member in the communication hole of the housing, wherein the external member comprises a pair of dividable members that is dividable in a direction intersecting a hole direction of the communication hole provided in the housing, and the external member passes the electric cable within the pair of dividable members and presses the electric cable with the pair of dividable members, and thereby changes a direction of the electric cable at the outside of the housing into the direction intersecting the hole direction.

* * * * *